United States Patent
Switzer et al.

(10) Patent No.: US 7,433,324 B2
(45) Date of Patent: Oct. 7, 2008

(54) USER EXPERIENCE FOR COLLABORATIVE AD-HOC NETWORKS

(75) Inventors: David Switzer, Seattle, WA (US); Kamesh C. Tumsi Dayakar, Redmond, WA (US); Michael S. Bernstein, Bothell, WA (US); Ravipal S. Soin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 77 days.

(21) Appl. No.: 11/095,599

(22) Filed: Apr. 1, 2005

(65) Prior Publication Data

US 2006/0221858 A1    Oct. 5, 2006

(51) Int. Cl.
*H04L 12/28* (2006.01)
(52) U.S. Cl. .................. 370/254; 370/328; 370/347; 370/349; 370/395.1; 370/397; 370/400; 370/463; 455/41.2; 455/513
(58) Field of Classification Search ............ 370/254, 370/328, 338, 347, 349, 395.1, 397, 400, 370/409, 410, 463, 470, 471, 310; 455/41.2, 455/13.1, 513; 709/206
See application file for complete search history.

(56) References Cited

U.S. PATENT DOCUMENTS

| | | | | |
|---|---|---|---|---|
| 5,666,490 A | * | 9/1997 | Gillings et al. | 709/238 |
| 6,061,512 A | * | 5/2000 | Lin et al. | 717/168 |
| 2004/0165544 A1 | * | 8/2004 | Cornett et al. | 370/254 |
| 2004/0267891 A1 | * | 12/2004 | Hoeye et al. | 709/206 |
| 2005/0221752 A1 | * | 10/2005 | Jamieson et al. | 455/1 |
| 2005/0243792 A1 | * | 11/2005 | Simon et al. | 370/347 |
| 2005/0254443 A1 | * | 11/2005 | Campbell et al. | 370/310 |
| 2006/0010230 A1 | * | 1/2006 | Karklins et al. | 709/223 |
| 2006/0092920 A1 | * | 5/2006 | Karamchedu et al. | 370/352 |
| 2006/0133340 A1 | * | 6/2006 | Rybak et al. | 370/338 |
| 2006/0264227 A1 | * | 11/2006 | Takahashi et al. | 455/513 |
| 2006/0291473 A1 | * | 12/2006 | Chase et al. | 370/395.5 |

* cited by examiner

*Primary Examiner*—Matthew Anderson
*Assistant Examiner*—Shaima Q Aminzay
(74) *Attorney, Agent, or Firm*—Wolf Greenfield & Sacks, P.C.

(57) ABSTRACT

A system and method for creating an ad-hoc network is described. A user may navigate a number of options to create an ad-hoc network and/or join an ad-hoc network using the described system.

20 Claims, 22 Drawing Sheets

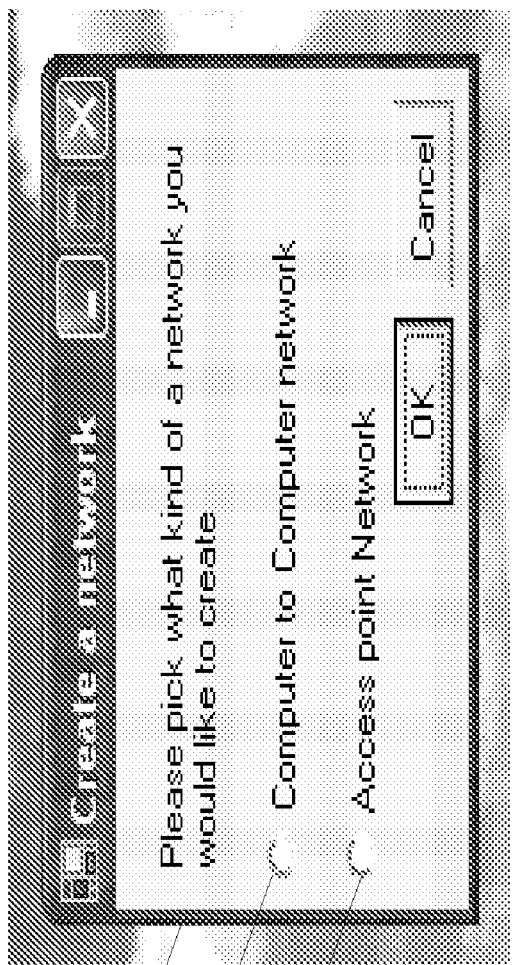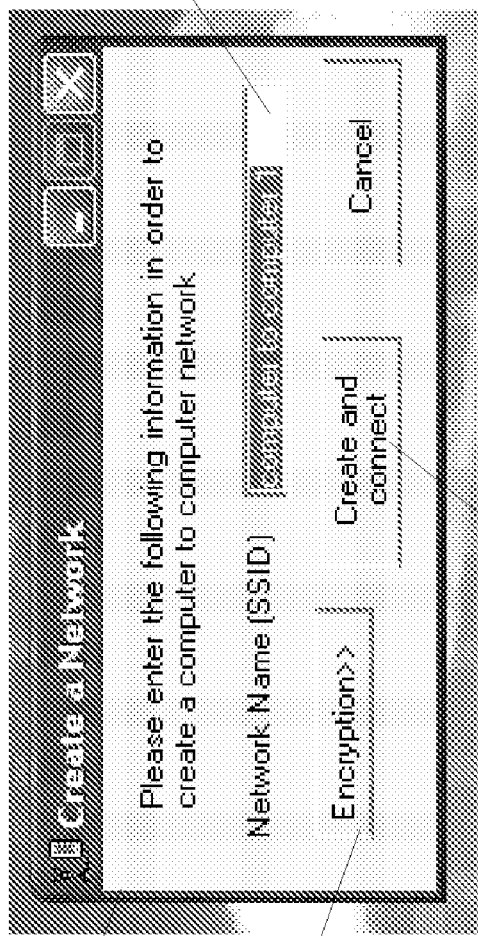

USER EXPERIENCE FOR COLLABORATIVE AD-HOC NETWORKS

BACKGROUND OF THE INVENTION

A. Field of the Invention

Aspects of the present invention relate to computing systems. More particularly, aspects of the present invention relate to creating ad-hoc networks for mobile users.

B. Description of Related Art

Mobile computer users experience difficulty in exchanging information when not connected to a wireless infrastructure. Despite complex networking and computational abilities of today's mobile computing devices, people often rely on ancillary items to exchange data, including but not limited to USB keys and infrared ports. While having the hardware to communicate between local computers or share a resource (for example, a camera or internet connectivity), this potential is not used for a variety of reasons including the difficulty in creating the network to the low acceptance of applications that permit such networking.

A solution to the need for local connectivity is an ad-hoc network. The use of the ad-hoc network involves three steps: 1) creating the ad-hoc network, 2) discovering other resources and/or other users, and 3) using applications that leverage the discovered resources/users to use the ad-hoc network. For purposes herein, an ad-hoc network is a temporary, private network that may be used for a specific purpose in the absence of any network resource such as a wireless access point. A variety of protocols may be used to establish an ad-hoc network including WiFi and the IEEE 802.11* series of protocols, Bluetooth, and the like.

One concern with conventional systems is the current multi-step process needed to create an ad-hoc network. Unfortunately, the process to follow to create the wireless network is not readily apparent or easy to use for the common user. Without the establishment of the ad-hoc network, applications (including collaborative applications) that make use of the network do not function to their potential.

Also, a problem with conventional approaches is that there is no public way for independent software vendors (ISVs) to create ad-hoc networks. In response, some ISVs (for example, Colligo of Vancouver BC Canada) have created proprietary pathways for communication with low level components directly, thereby bypassing an operating system's user experience (for interacting with the operating system and other applications that leverage the operating system's user experience), the operating system's support features, and the operating system's diagnostics.

In some situations, a resources is not available to users who may wish to create an ad-hoc network. These situations include:

a. No available resources (or infrastructure). This may occur during impromptu meetings between users not tied to a specific location. While the number of wireless hotspots is increasing around the world, the number of hotspots will always trail behind the locations where users want to connect to one another.

b. No subscription to an available hotspot. Hotspots have different providers. The different providers each have their own subscription services. In a number of cases, a user may not be subscribed to a particular hotspot.

c. Fees. Even if a user is subscribed to a hotspot and has access to the hotspot's capabilities, the user may desire to avoid using the hot spot to minimize fees associated with the hotspot.

d. Privacy or security—Ad-hoc networks can also be used to provide a level of privacy and security. For instance, one may wish to have a local connection to, for instance, a printer and not desire to expose it to others on a network. This leads to a collection of devices where some may exist in an ad-hoc connection mode while others exist in an infrastructure node. Management of these devices using conventional techniques is cumbersome.

An improved ad-hoc network creation and use system is needed.

BRIEF SUMMARY OF THE INVENTION

Aspects of the present invention address one or more of the problems described above, thereby providing an improved ad-hoc network creation and use system.

BRIEF DESCRIPTION OF THE DRAWINGS

The present invention is illustrated by way of example and not limited in the accompanying figures.

FIGS. 19-28 show alternative user interfaces in accordance with aspects of the present invention.

DETAILED DESCRIPTION OF THE INVENTION

Figure 1:
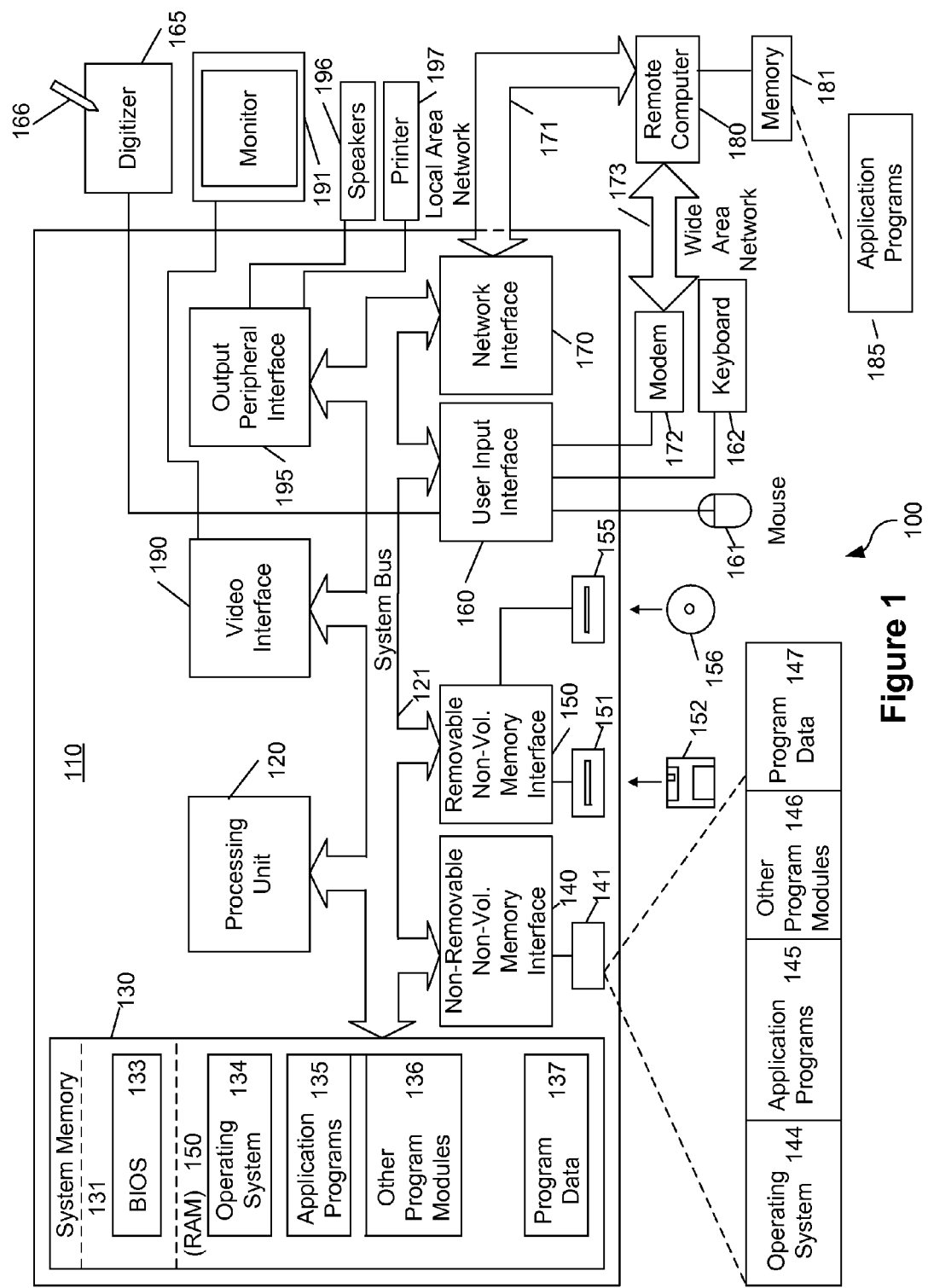
FIG. 1 shows an illustrative example of a general-purpose computing environment in accordance with aspects of the present invention.

Aspects of the present invention relate to a user experience for the creation and use of collaborative ad-hoc networks.

This document is divided into sections to assist the reader. These sections include: overview, general-purpose computing environment, ad-hoc network create/join, and alternative user interfaces for creating an ad-hoc network.

It is noted that various connections are set forth between elements in the following description. It is noted that these connections in general and, unless specified otherwise, may be direct or indirect and that this specification is not intended to be limiting in this respect.

A. Overview

Aspects of the present invention relate to providing an easy process for a user to create an ad-hoc network. The users may want to create the ad-hoc network for the purpose of exchanging information with others without the burden of connecting to a hotspot or in the absence of any network resource.

Conventional approaches to establishing ad-hoc networks are difficult for users to discover and use. For instance, conventional ad-hoc network creation includes the following steps:

a. The participants need to meet.

b. They need to agree on an SSID.

c. They need to go through many UI interactions to add an ad-hoc network with a selected SSID.

d. They need to find the address of the peers with whom they want to interact. Currently, once the devices have joined a network, a user needs to find out the IP address of the peer. This information needs to be obtained out of band such as by verbal communication.

e. There are hardly any set of services and applications that can be used in an ad-hoc network.

Even after the above steps are done, other issues remain such as:

a. Consistency and Interoperability
   i. The creation and maintenance of an ad-hoc network relies on many functions including the specific implementation, which is vendor specific. Vendors use proprietary algorithms to detect an ad-hoc network to decide whether they should join a network or start a new one. The flaws in such implementations may cause splits in a network where the same network is instantiated on different channels concurrently. Also, there are no clear criteria on whether they should support power management. Even if they implement power management, the vendors decide the implementation approaches. This can cause errors between different vendors. Some examples of implementation approaches include: when to start power save modes and how to detect if other stations are in power-save modes so that the packet exchanges can be scheduled accordingly.
b. Security
   i. Currently for ad-hoc in Windows, the only security mode available is Wired Equivalent Privacy (WEP), defined in the 802.11 standard. The WEP security is weak and there are many papers that point out its vulnerabilities and how they can be attacked. Higher security modes such as Wi-Fi Protected Access (WPA) are only available for infrastructure modes.
c. Power management
   i. The power management policies and procedures are not defined for ad-hoc networks.
d. Quality of Service (QoS)
   i. The QoS implementation in the ad-hoc network is not defined.

Aspects of the present invention relate to providing an easy way to set up an ad-hoc network. In various aspects of the present invention, one may see one or more of the following benefits:

a. Being able to form an ad-hoc network without needing to meet other users ahead of time.
b. Being able to form an ad-hoc network without needing to constantly specify an SSID. Here, some aspects of the invention allow users to detect other users around them without configuring an SSID. It can also be added to a user's machine by the network administrator. It can be also set while still connected to a resource, for example by accepting an invitation email.
c. Unlike the Instant Messenger, a user may want to collaborate in different networks. Aspects of the present invention allow one to easily add and configure a new ad-hoc network, set order of preference, or manually select the ad-hoc network in which the user wants to collaborate.
d. Aspects of the present invention allow the discoverability of others in the same ad-hoc network.
e. Aspects of the present invention support applications that may be used commonly with an infrastructure (or resources). Examples of common applications are sharing folders and messaging. These require services such as DNS that are part of a standard infrastructure but cannot be found in an ad-hoc network.

Aspects of the present invention permit the selection of various options including security, QoS, and power management functions. Many ad-hoc networks do not exist for long periods of time and may not have strong security requirements. For example, a gaming session does not require the same level of protection as a chat session or file sharing. For such usages the WEP security may be adequate. For stronger security requirements, WPA can be used without power management and without QoS requirements. For strongest security and also to enable QoS and power management, one may use advanced NICs with a full 802.11i implementation.

The 802.11i (TGi) is a supplement to the 802.11, which provides specification for robust security. Wi-Fi Protected Access (WPA) is a subset of the 802.11i that provides interim security solutions that are stronger than WEP and backward compatible with the existing 802.11 implementations. Both TGi and WPA rely on 802.1X to provide authentication and key management.

Aspects of the invention may include user interfaces that allow a user to easily set up an ad-hoc network. Other aspects of the invention relate to the ability to create the ad-hoc network using system resources and operating system components, rather than a stand-alone application. One of the benefits of creating the ad-hoc network using the operating system as opposed to a single application is that the user's interaction across two or more applications may be standardized, thereby making ad-hoc network creation easier for the end user.

B. General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. For instance, a machine may have a wireless network adaptor that can use at least one of the following protocols (IEEE 802.11 series and Bluetooth and the like).

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

C. Ad-Hoc Network Create/Join

FIGS. 2-12 relate to ad-hoc network usage.

Figure 2:
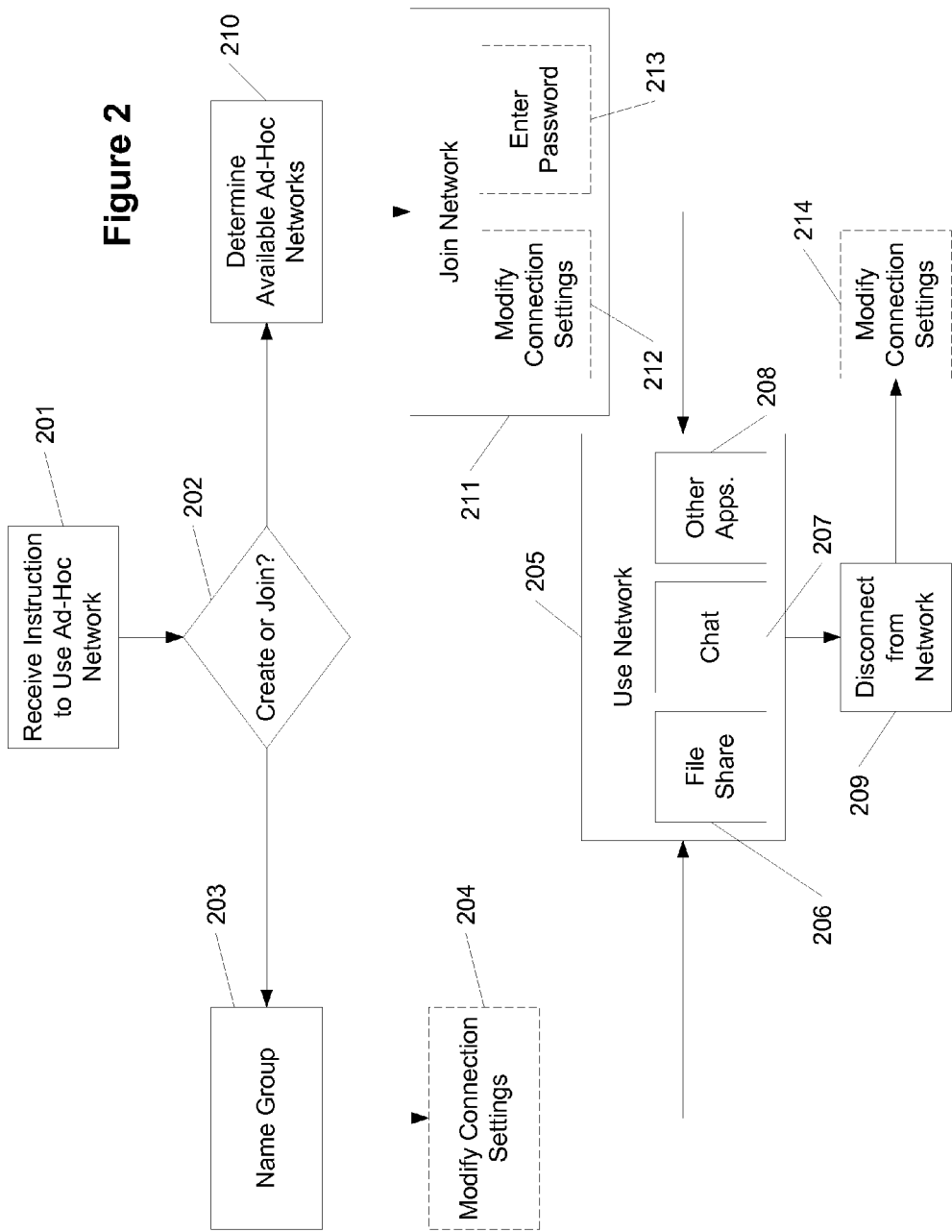
FIG. 2 shows a process for establishing and using an ad-hoc network in accordance with aspects of the present invention.

FIG. 2 shows a process for joining/creating an ad-hoc network. In step 201, a system receives and instruction to use an ad-hoc network. The instruction may be explicit (as in create or join an ad-hoc network) or may be implicit (as in to transfer files, chat, or use an application in which one of the options is to perform these tasks using an ad-hoc network).

In step 202, the system determines whether the user wants to create or join an ad-hoc network. If the user wants to create an ad-hoc network, then in step 203, the user is prompted to name the new group. Alternatively, the system may pick a name for the group (for instance, "ABC's Group" where ABC was the user of the computer). Optionally, in step 204, the user may be presented with the option to modify the computer's connection settings. For instance, if a user is using a wireless interface to connect to a hotspot, the modify connection settings step 204 may provide the user with the option to disconnect from the hotspot and establish an ad-hoc network. In some instances, this option may also include a warning that the user may lose a connection to the services provided on the existing connection (for example, connection to the internet).

Here, it is noted that not all connections need to be terminated to connect to an ad-hoc network. For instance, a user may have two or three network interface units. So, for example, a user may remain connected to an infrastructure network using a first wireless network interface card (or wired connection) while establishing an ad-hoc network using a second wireless network interface card.

Next, in step 205, the user uses the network. The use of the network may include a number of applications including file sharing 206, chat 207, and other applications 208.

In step 209, the user disconnects from the network. In optional step 214, the user may be presented with the option to modify the connection settings again.

From step 202, the user may wish to join an ad-hoc network rather than create one. In step 210, the system determines available ad-hoc networks. This may be done by sensing a beacon. The beacon may be part of a network broadcast message that alerts users that they may join the network. Alternatively, the beacon may be separate from other messages. For example, if a user starts an operating system utility for file sharing in an ad-hoc network for a particular meeting, then the broadcast beacon may be sent with the ad-hoc network's name or SSID reflecting the utility name or any other predetermined mechanism. In step 211, the user joins a selected ad-hoc network. This may also include optionally modifying connection settings step 212 as in step 204. Also, this may include optionally entering a password in step 213.

Next, in step 205, the user uses the network as described above.

FIGS. 3-12 provide various user interfaces for creating/joining an ad-hoc network. Some or all of the following may be used to guide a user in creating/joining an ad-hoc network.

Figure 3:
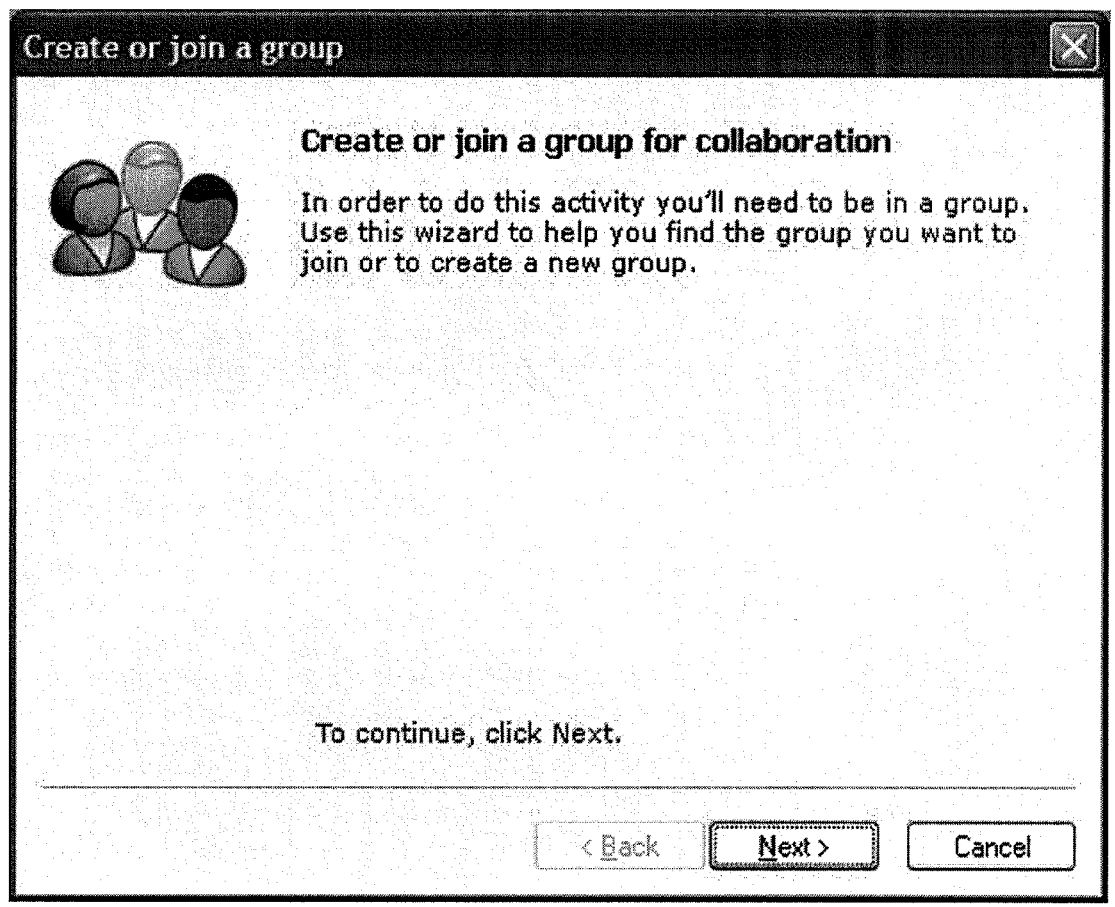
FIGS. 3-12 show user interfaces related to the creation and use of an ad-hoc network in accordance with aspects of the present invention.

FIG. 3 shows user interface 301 that provides a welcome screen to a user and introducing the user to collaboration groups.

Figure 4:
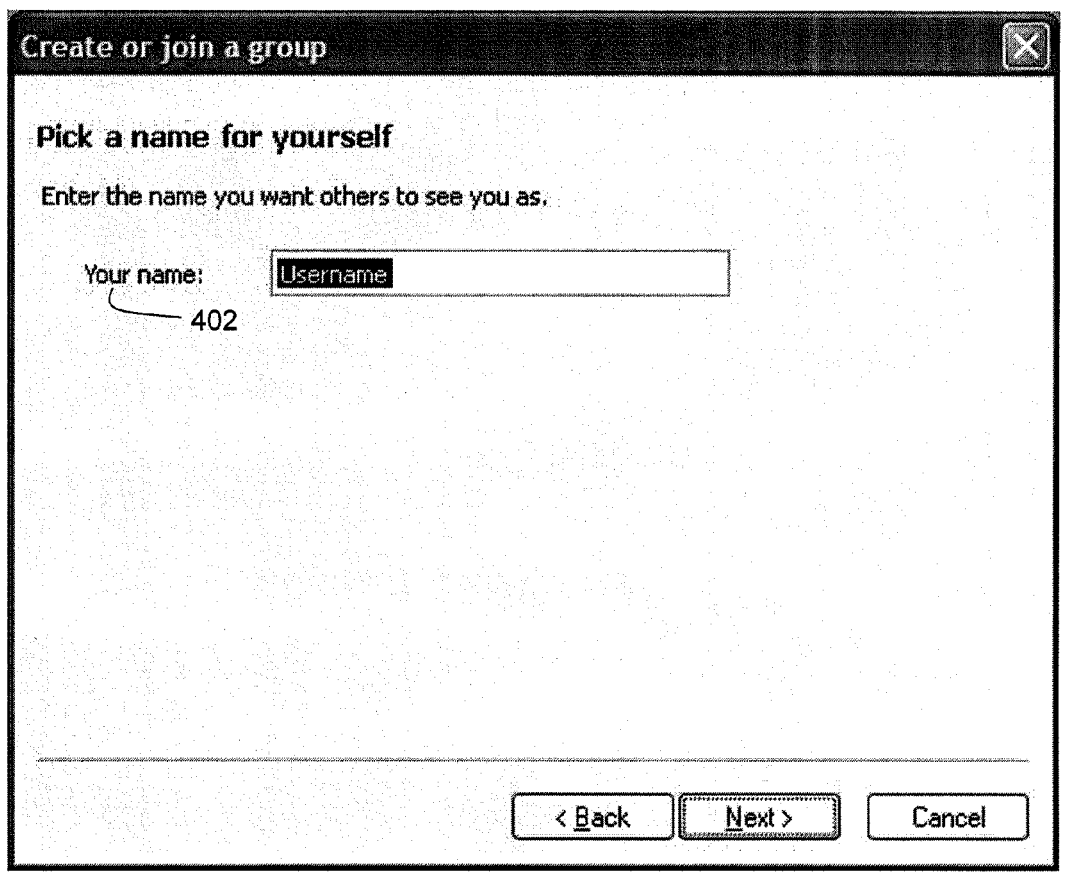

FIG. 4 shows user interface 401 with the input region 402 accepting a user's designation of a name by which others in the group or collaboration will view the user. The default value may be the computer user's name. This page may be launched every time a user initiates an ad-hoc group or may be displayed during the first time the user launches an ad-hoc network. Changes here to the name are used by other applications. The name may be a global setting that is shared by all the collaborative applications. Changes to the name in one application should affect the name in other applications that are currently active. Changes to the friendly name should update the user's name on all the user machines that are part of the collaboration group.

Figure 5:
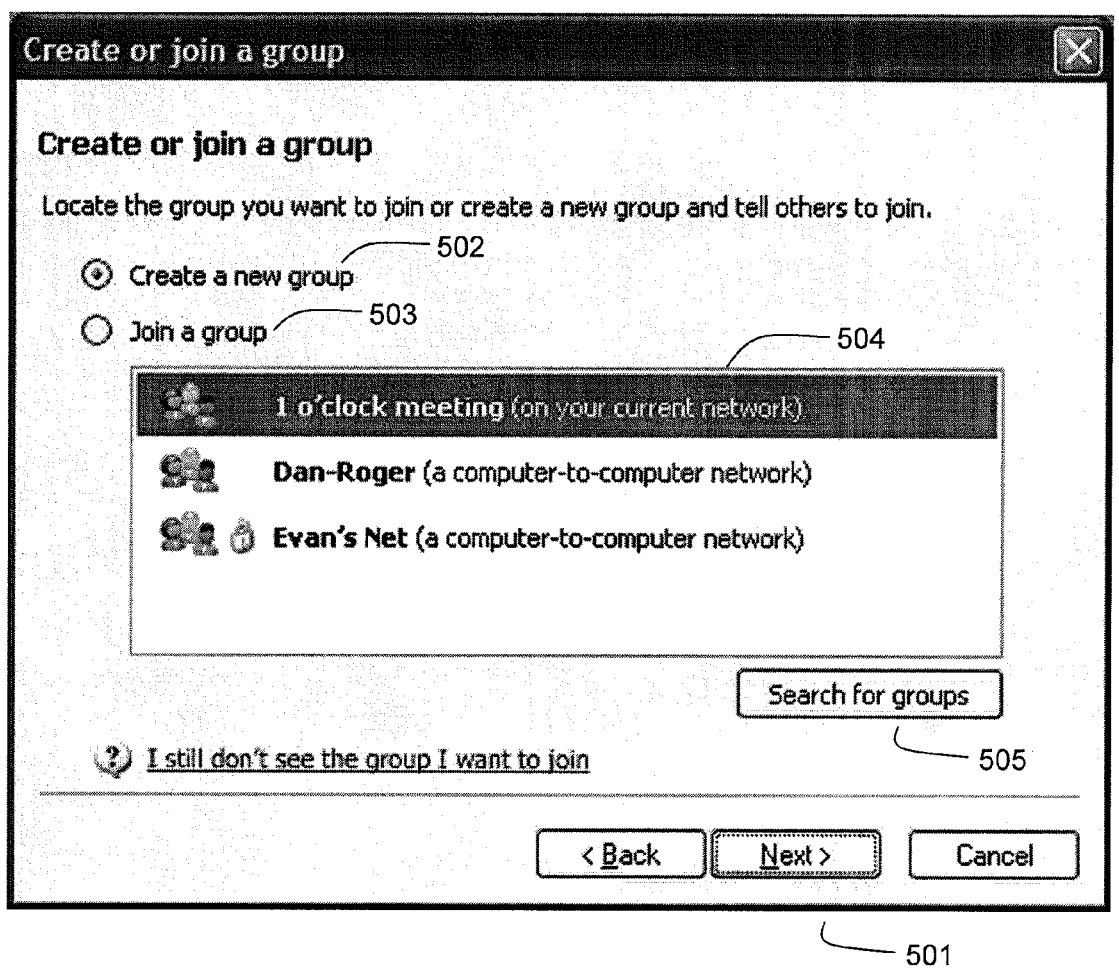
Figure 6:
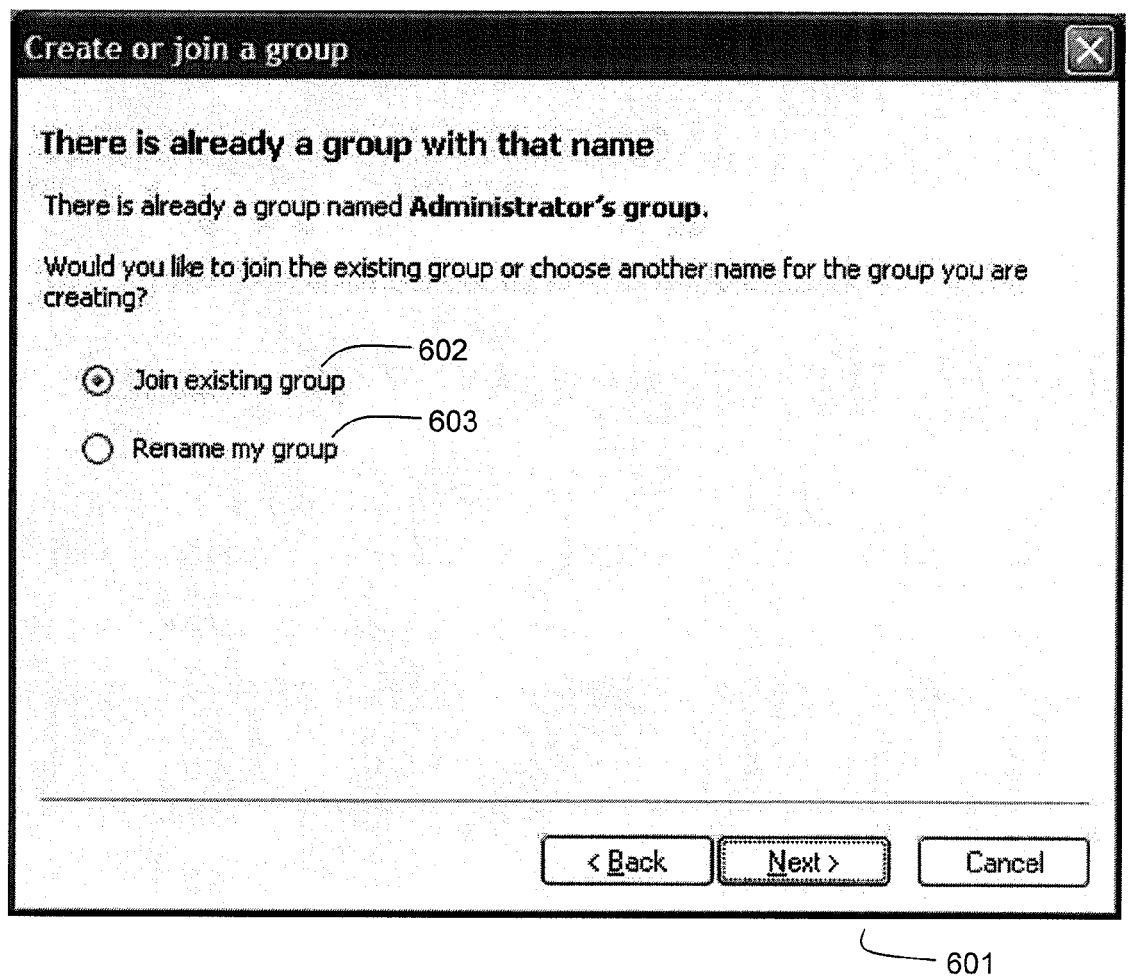

FIG. 5 shows user interface 501 in which a user is provided with the option to create a group 502 or join a group 503 with groups listed 504. Also, a search button 505 may be provided for the user to request the computer to search for groups.

On joining a network, the following options may be used:

a. The list of collaboration groups for users to join can be a superset of the following:
  i. All available groups in the current infrastructure network (if applicable)
  ii. All the available ad-hoc networks
    1. This should also include the current ad-hoc network (if applicable)
b. As long as this page is displayed, the list can be refreshed automatically at frequent intervals.
c. Access to "Refresh" for manually forcing the list of currently available groups to update manually (button 505).
d. Once the user selects the group to join, if it is password protected, a password entry screen is displayed.
e. Joining a network may also involve configuring any Firewall related settings to enable the ad-hoc network features.
f. In case the user is not able to join the collaboration group and if the process can be re-attempted, a Join Error screen can be displayed.
g. In case the error is non-recoverable (due to some infrastructure issues), an appropriate error dialog "No network infrastructure" can be displayed.
h. If the user is successful in joining the collaboration group, then current user's presence can be published to others.

The following relates to joining an ad-hoc network:

a. When joining an ad-hoc network requires the user to disconnect from an infrastructure network to connect to the new ad-hoc network, a Confirm Network Settings Change screen must be launched (as shown in FIG. 2, step 212).
b. In case the user chooses to join a collaboration group on a Wireless ad-hoc network, every effort must be made to connect to it.
  i. This may also include configuring "Network Preferences" (ad-hoc vs. Infrastructure networks) so that the user can join the ad-hoc network.
  ii. This may also involve changes to the way one currently depends on DHCP to assign IP addresses so that one can get an IP address as fast as possible.
  iii. If the File Sharing application is launched, and if non-local files (files on the network) are part of the pre-selection, then the pre-selected files must be copied locally automatically before switching the networks.

iv. As an edge case scenario, if users have multiple wireless adapters that are connected to different infrastructure networks, the user can be given an option to choose the network adapter that he wants to disconnect by launching the Choose Network Adapter page.

When joining an infrastructure network, the following may be performed:

a. In case the user chooses to join a collaboration group on an infrastructure network, they don't need to be connected to any new networks but need to publish "presence" information about the new collaboration group When a user creates an ad-hoc network, the following may occur:

a. A name and password (optionally) may be accepted from the user.

For an ad-hoc network:

a. For new collaboration groups on an ad-hoc network, a new ad-hoc network can be created with the following details:
  i. Default for Collaboration Group Name="[Windows User Name]'s Group"
  ii. This default is used ONLY if the computer's "Default Group Name" parameter value is empty.
  iii. Network name (SSID)=Collaboration Group Name.
  iv. Password=Optional.
  v. When it requires the user to disconnect from an Infrastructure network to connect to a new ad-hoc network, a confirm network Settings Change screen can be launched (see step 204).
  vi. In case the user chooses to join a collaboration group on a Wireless ad-hoc network, every effort should be made to connect to it.
    1. This may also include configuring "Network Preferences" (ad-hoc vs. Infrastructure networks) so that the user can connect to the ad-hoc network. As a specific example, when an ad-hoc network is created (from Infrastructure), the default setting "Any available network (access point preferred)" can be changed to "Computer-to-computer (ad hoc) networks only" setting to enable the creator to get connected to the newly created ad-hoc network. This may also involve changes to the way one currently depends on DHCP to assign IP addresses so that one can get an IP address as fast as possible.
    2. If a file sharing application is launched through any of the file related launch points, and if non-local files (files on the network) are part of the pre-selection, then the pre-selected files can be copied from remote machines on the network to the local machine automatically before switching the networks.
    3. As an edge case scenario, if users have multiple wireless adapters that are connected to different infrastructure networks, the user can be given an option to choose the network adapter that he wants to disconnect by launching a choose network adapter page.

To alert a user to the system attempting to connect to an ad-hoc network, while trying to create a group after the user enters a password, a progress dialog can be displayed to indicate activity in progress while connecting to the new ad-hoc network.

For an infrastructure network:

a. For new collaboration groups on infrastructure networks, the following requirements can be satisfied:
  i. Default for Collaboration Group Name="[Windows User Name]'s Group"
    1. This default is used ONLY if the wizard's "Default Group Name" parameter value is empty.
  ii. Password=Optional
  iii. The password in this case needs to be passed to the application so that it can be authenticated at an application level when users try to join this group. The current user who creates a new group should publish Simple Service Discovery Protocol (SSDP) packets with additional information about the "Collaboration Group Name"

The following lists various common requirements that exist for both ad-hoc and infrastructure networks:

a. When users try to CREATE an already "Available" Collaboration group, the Group Already exists page can be displayed
b. Creation of groups may also involve configuring any Firewall related settings to enable these features
c. In case, the user is not able to create the collaboration group and if the process can be re-attempted, the Create Error screen can be displayed
d. In case the error is non-recoverable (due to some infrastructure issues), an appropriate error dialog No network infrastructure can be displayed
e. If the user is successful in creating the collaboration group, then current user's presence can be published to others If a user attempts to create a group and the name is already in use, FIG. 6 may be displayed in which user interface 601 includes the options to join the group 602 or rename the user's group name 603. If the user chooses to rename the group, the user may be taken back to a screen that allows the user to pick a name for the group.

Figure 7:
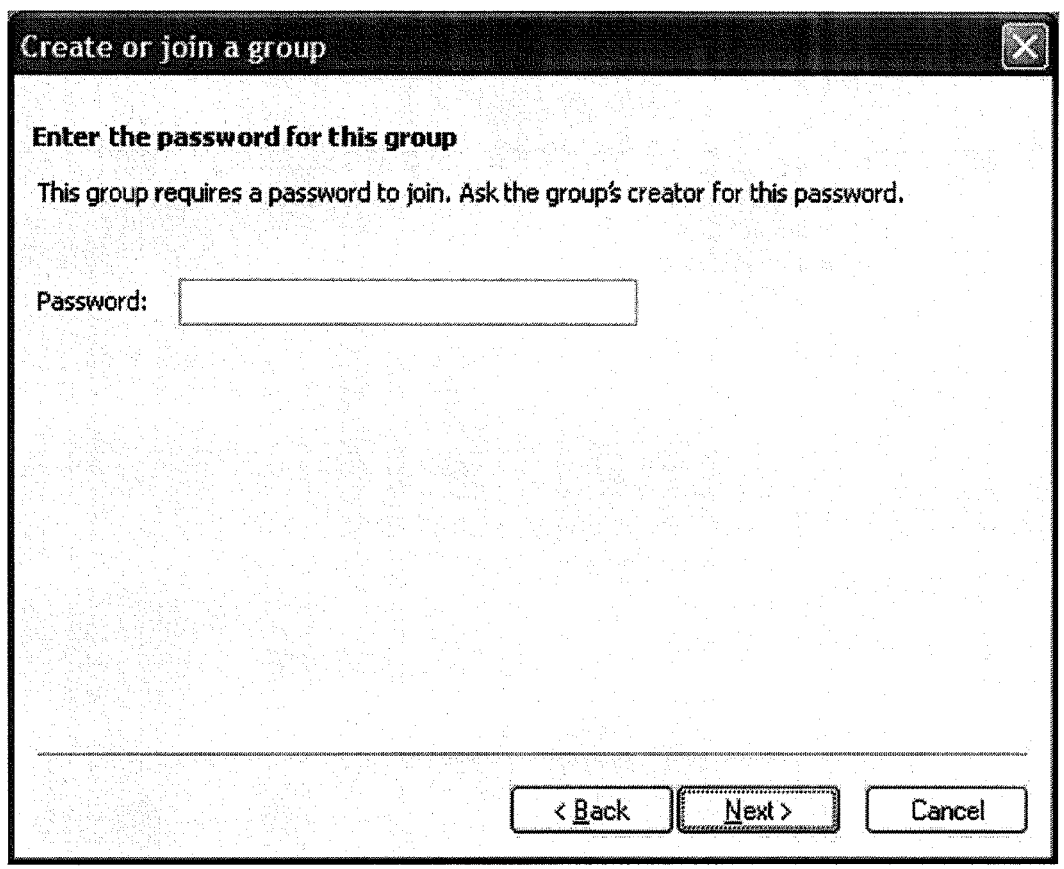

FIG. 7 shows a user interface used in a JOIN scenario where the user is prompted for his password after selecting the collaboration group.

For an ad-hoc network, a. In case of joining ad-hoc networks, the password can be used to generate the WEP key for the ad-hoc network and the user can be authenticated to join the ad-hoc network. This password authentication done at a "network" level can be handled by a wizard controlling the process.
b. If network authentication succeeds, then password authentication can be done for the group at an "application" level. The application may provide notifications on whether the authentication is successful or not (for instance, by means of an "Event" based model). Once the user enters the password, a progress dialog can be displayed to indicate activity in progress if one requires connecting to new networks. An alternative implementation might require separate passwords for network authentication and application authentication to provide increased security.

For an infrastructure network.

a. In case of joining collaboration groups on infrastructure networks, the password authentication may be done only at an "application" level. The application may provide notifications on whether the authentication is successful or not (by means of an "Event" based model for instance).

Figure 8:
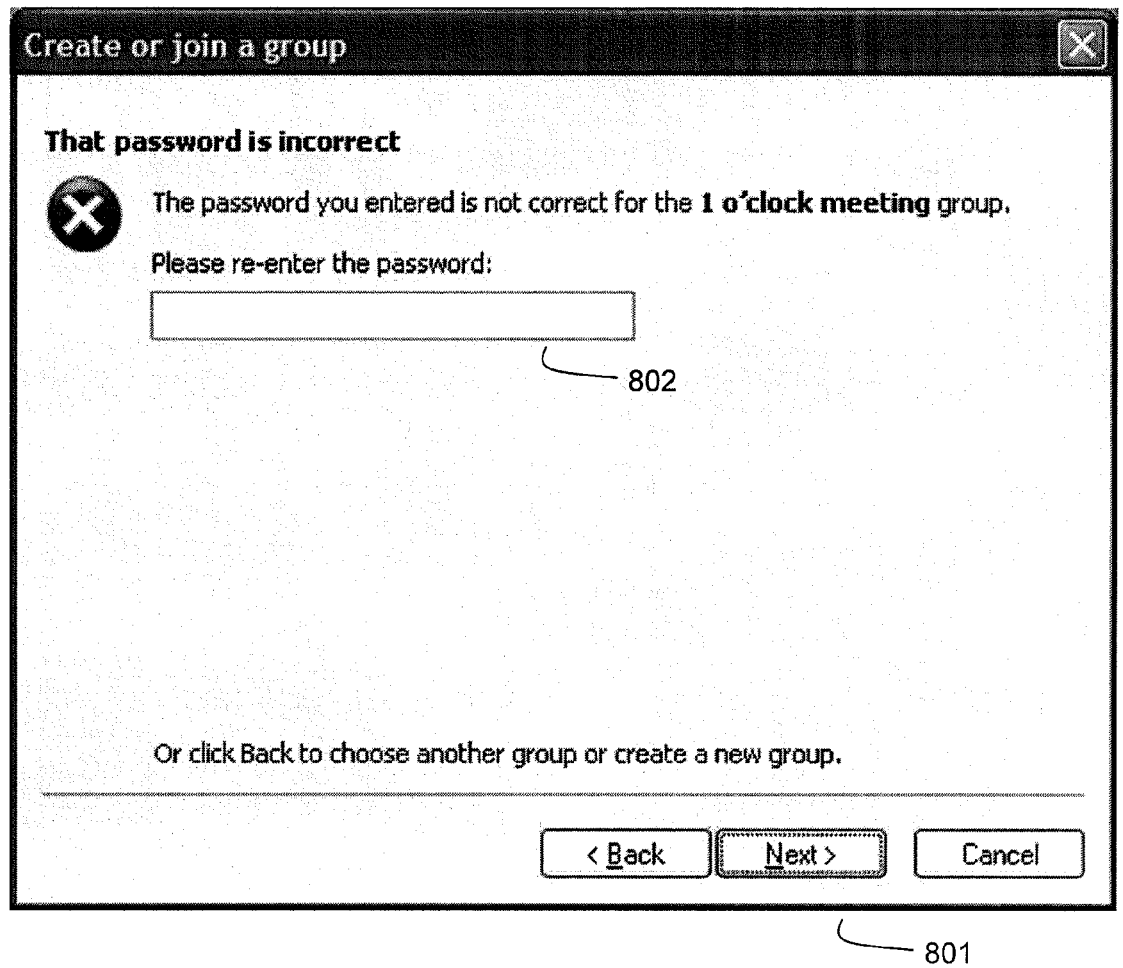
Figure 9:
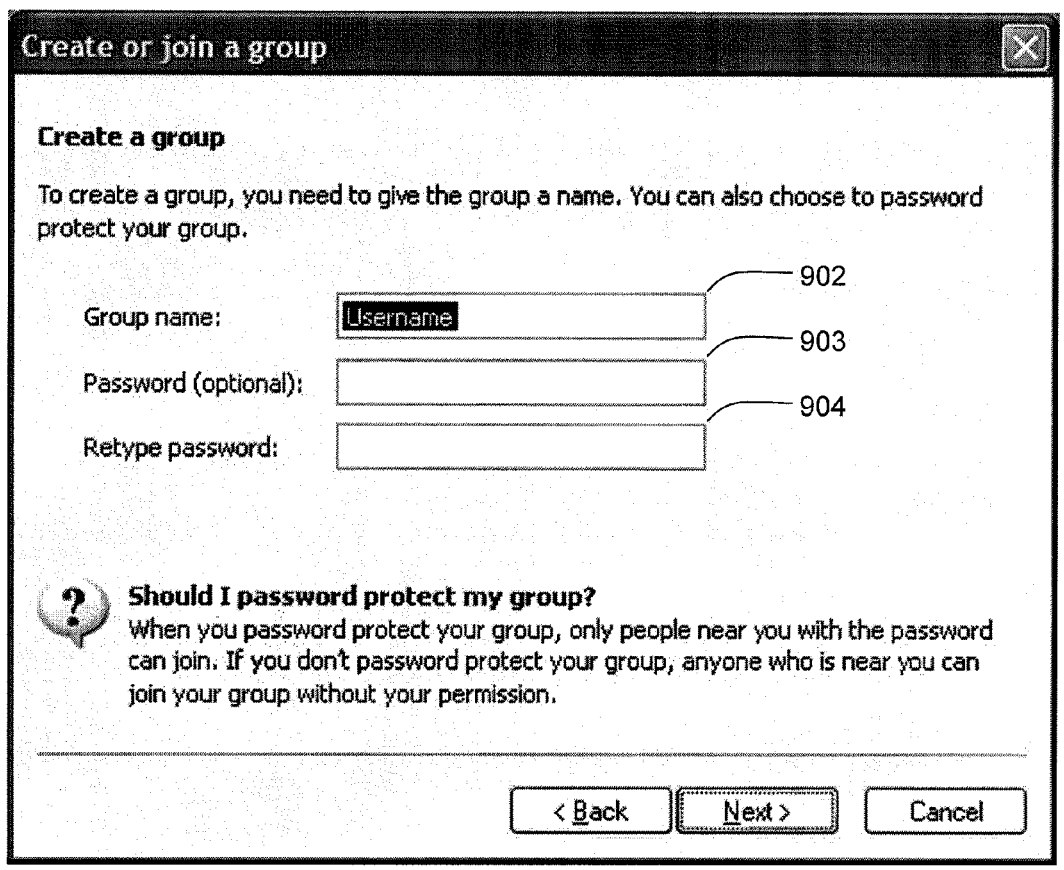

FIG. 8 shows a screen that may be displayed when encountering an invalid password. The reasons leading to screen 801 with area 802 to receive the password include:

Ad-hoc network authentication failure (which would also fail the application level authentication)

a. Application level authentication failure for groups in case of infrastructure networks
b. This provides the user with an opportunity to retype the password FIG. 9 shows an interface 901 for creating a group. Interface 901 may include a space 902 for receiving a group name, a space 903 for receiving a password, and a space 904 for retying the password.

Interface 901 may be an optional page that is displayed if the user chooses to CREATE a group only if he is currently connected to some infrastructure network (Wireless or Wired infrastructure network) and has the necessary network infrastructure support to create an ad-hoc wireless network. If the user is on an infrastructure network and there is no additional network infrastructure support to create an ad-hoc wireless network, this page may be skipped and it is assumed that a collaboration group needs to be created on the infrastructure network by default.

This screen 901 provides an option for users to either CREATE a new group on the current infrastructure network or on a new Wireless ad-hoc network.

Figure 10:
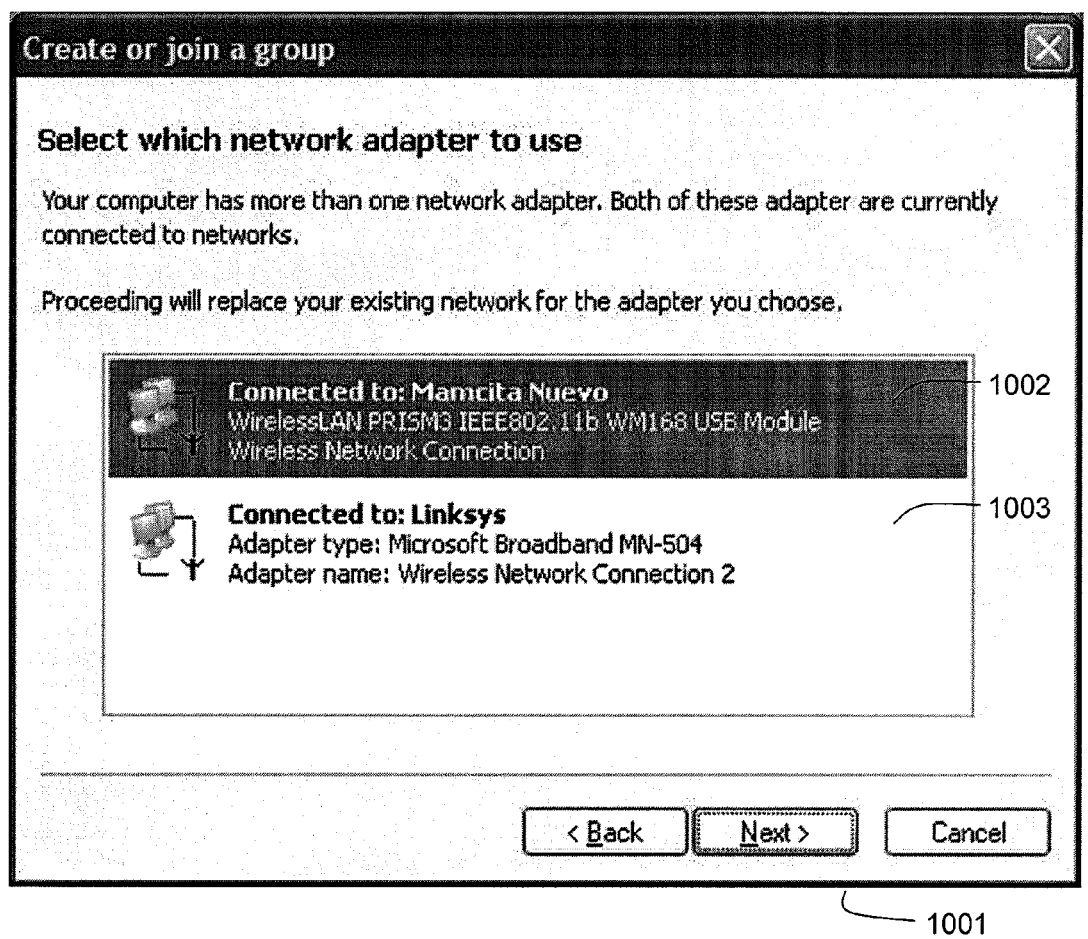

FIG. 10 shows a user interface 1001 with a number of network adaptors (here 1002 and 1003) allowing a user to select among the network adaptors.

This screen 1001 is displayed in both the Join and Create collaboration group scenarios on ad-hoc networks, if multiple wireless adapters connected to different infrastructure networks are present.

This screen 1001 provides an option for the user to choose the right adapter that needs to be disconnected from infrastructure to create the new ad-hoc network (showing here network adaptor 1002 and network adaptor 1003).

Figure 11:
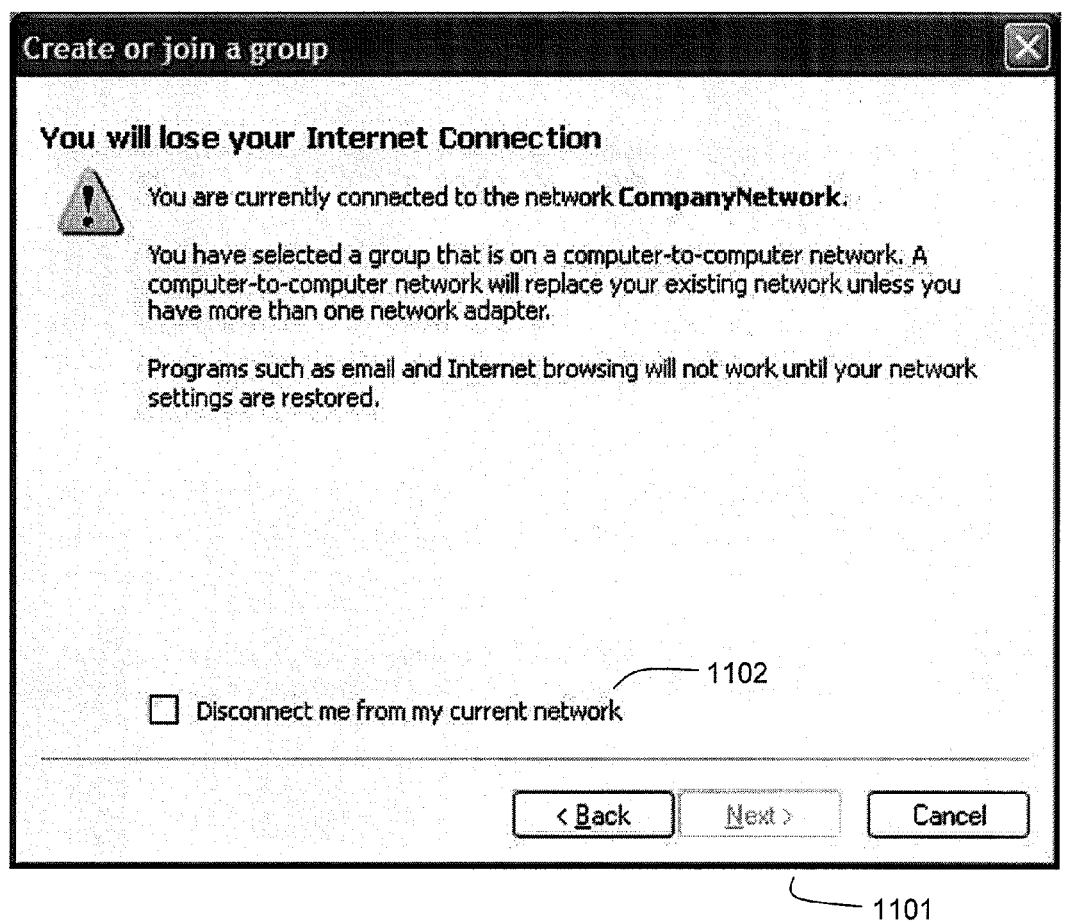

FIG. 11 shows a confirm network change dialog 1101 with a check box 1102 authorizing the disconnection from a current network. This is an optional page that is displayed only when it requires the user to disconnect from an old network (ad-hoc or Infrastructure) to connect to a new network to complete the Create/Join process.

Figure 12:
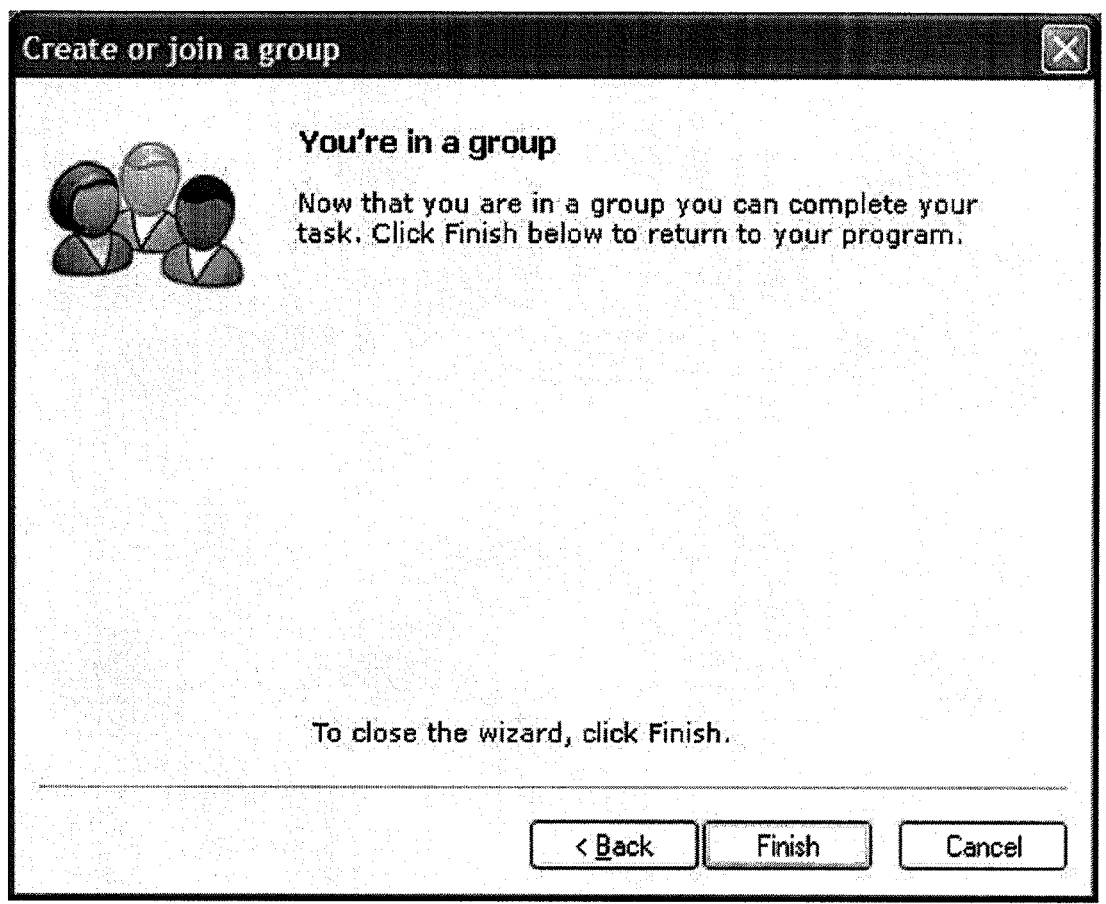

FIG. 12 shows interface 1201 when the create/join process is successful.

The following provide a number of options that may be used with aspects of the present invention.

Navigation

The wizard that a user uses to configure an ad-hoc network may support normal "back" navigation features to navigate to previous wizard pages. Once a user navigated "back" to a previous page, as long as one did make any changes to the settings, all settings in the subsequent pages can be restored (by defaulting with the correct value). After "back", if one makes any changes, the system may not remember any of the old settings in the subsequent pages when one clicks "next".

Extensibility and Customization

The wizard can provide the following customization features so that it can add contextual information based on the collaboration application. This can be implemented as wizard properties that could be configured by passing "parameter" values to the wizard when it is launched from an application. The collaboration application may include file sharing applications, gaming applications, audio/video, and other point to point applications.

a. Task Name
   i. The wizard can support limited extensibility in the form of application specific user-assistance messages in selected places in the wizard so that it can be customized for specific applications/scenarios.
b. Default Group Name
   i. The system may keep a single group name for a user. However, the group name may be modified based on the application used. For example, if started with a file transfer program, the system may call the group name "ABC's File Transfer Group". If started from a gaming group for the game Hearts, the group name may be "Hearts Group" or "ABC Hearts' Group".

File Sharing Application

Figure 13:
FIGS. 13-16 show user interfaces associated with file transfers in accordance with aspects of the present invention.

FIG. 13 shows a sample user interface for a file sharing application. FIG. 13 is for illustrative purposes only. Other interfaces may be used. User interface 1301 includes a list of users present on the ad-hoc network 1302, a list of files that are available for transfer 1303, and a list of available files 1304 from other users that the current user may download. The list of files 1303 and 1304 may include an owner 1304 and the status available for the files.

The following describes an illustrative behavior for a file sharing application as shown in FIG. 13.

a. The file sharing application can be implemented as a single instance application. If a user tries to launch it when an instance of it is already active, then the existing instance can be given focus and brought to the foreground.

b. The collaboration wizard may or may not be tied into the application such that launching the application launches the wizard in the foreground with the file sharing application in the background.

c. The wizard may be launched as a "modal" application and users can access the application only after the wizard operation is completed.

d. If the user selects Cancel or clicks the Close button on the wizard then the application can remain open with the application in the "not in a group" state.

e. The application can implement an internal security mechanism (using Windows Peer-to-Peer Networking, for example) to handle authentication at the application level for collaboration groups on infrastructure networks.
   i. They can also implement events to notify the wizard of password success/failure.

f. The application window can be resizable, maximizable, and minimizable.

g. The application may include the following components:
   i. File sharing component
   ii. Chat component
   iii. People control component The following describes the various file sharing, the chat and people control components:

File Sharing Component

Figure 14:
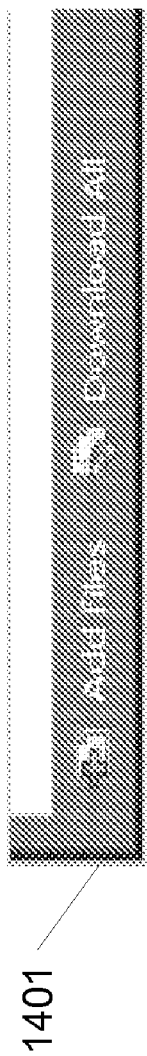
Figure 15:
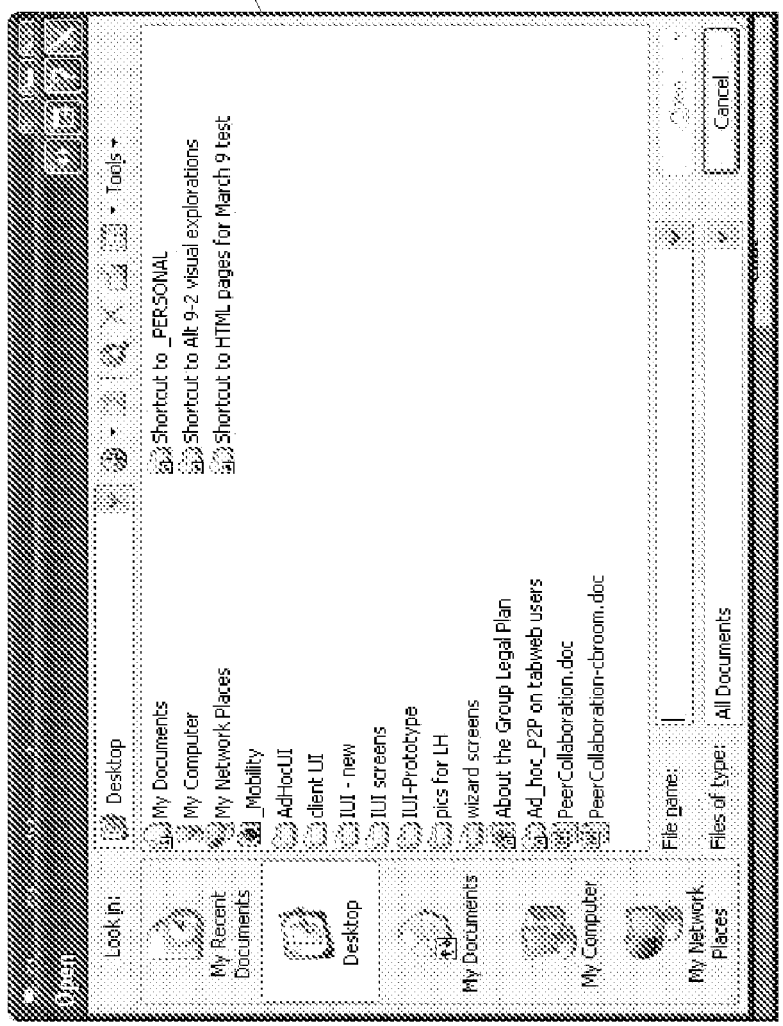

Users in a collaboration group can share files with each other through the file sharing application. The users may share files with everyone in the group. Here, the user may add files using the add files button of FIG. 14 to the shard files list. Clicking "Add files" will launch the Windows Open dialog 1501 as shown in FIG. 15. Users can select one or more files (using standard multi-select functionality provided by Windows® by the Microsoft Corporation of Redmond, Wash.) in the Open file dialog. When the user clicks OK the selected files are shared with others in the group and added to the list of shared files.

The file sharing component allows a user to view files shared by others in the group. Also, the files that are shared by the current user and those shared by the other users in the group are displayed in a list with the columns relating to the file name (that displays the name of the file with or without the extension with an icon), the owner (displays the person who is sharing the file), and the status of the file (displays the status of each file, which may be an actionable hyperlink), relative to the current user.

The files shared by the current user may be combined with or separated from those shared by other users. The separation may be made by the use of subheads with thin underlines.

Sorting on the above columns can be supported with the sorted results local to each of the 2 groups. Sorting can be initiated by clicking on the column header.

Each file that is shared by other users in the group can have following states:

a. Available for download—This state indicates that the file is being shared by another user in the group but the current user has not yet downloaded it. A hyperlink "Download" is shown and clicking this link launches the "Save As" dialog from the perspective of the current user.
b. Download in Progress—This state indicates that the file is currently being downloaded. Plain text "Downloading . . . " is shown with a hyperlink "Cancel" that cancels the download operation.
c. Downloaded—This state indicates that the file has been downloaded completely. The filename now becomes hyperlinked and clicking this hyperlinked filename opens the downloaded file in the associated application. If no application is associated, then it can prompt the user by launching a "Programs" dialog. In the Status column plain text "Download complete" can be shown.

Each file that is shared by current user can provide a method for the user to stop sharing the file. Thus a "Remove" hyperlink can be used (as appearing in the Status column) so as to remove each of the current user's files.

Figure 16:
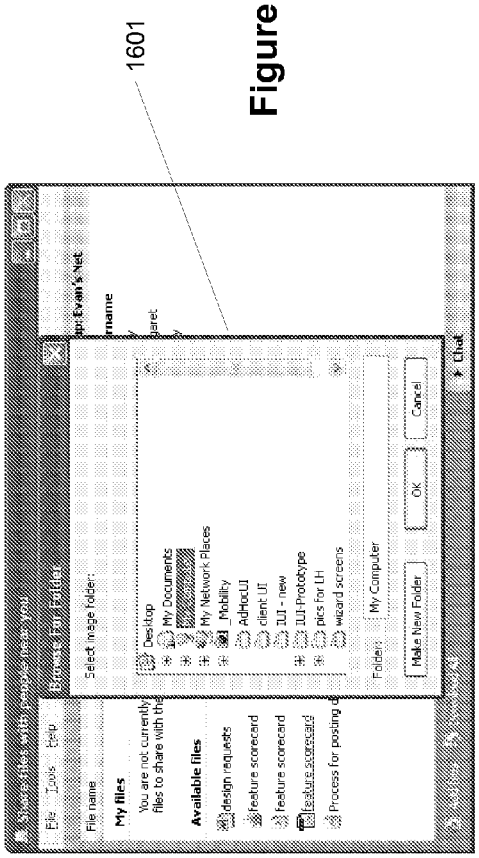

In addition to downloading individual files, there can be an explicit option to "Download All" available files. This can appear as a link/button below the shared files list as shown in FIG. 14. When "Download All" is clicked, a directory picker screen as shown in FIG. 16 can be displayed. Selection of the directory will allow all available files not yet downloaded to be downloaded into the selected directory.

If a file is unavailable or download fails for some reason that file is skipped and the system may attempt to download the next file. At the end of the whole operation, an error dialog may appear saying that the file was unable to download or the download failed. If a conflict in file names exists, a Save As dialog may be provided to the user to prompt the user to pick a new name for the file or replace the existing file.

Chat Component

Users in a collaboration group can chat with the other members of the group. The chat may include a simple chat control and a history window. The user may be allowed to chat with the entire group (by default) or chat with a specific group member (known as "whisper" or "side chat") by selecting that user in the "Send to" dropdown menu. Whispers can be displayed as the same or can be visually differentiated from the group chat in the history window. Also, the "Send to" menu can default to send to the "entire group" initially, then once a user selects a specific group member the drop down selection can remain on that user until the user manually changes the selection or the session ends (reset to default for every session).

A chat feature can be hidden/collapsed by using a form of collapsible UI. When the application is initially launched, the chat 'pane' is collapsed. In future sessions, the chat pane can be open or collapsed based on the last state in user's most recent session.

If a chat message is received while the chat pane is collapsed then the chat pane should open (to the default size) automatically. If the user has manually collapsed the chat pane during this session the system may not open the chat pane automatically again during that session. Here, where the chat pane is not opened automatically, an alternate visual indicator to indicate that a chat message was received (for example, blinking the collapsed chat title bar). For every new session, the chat component can revert to the default behavior (automatically opening the chat pane when a chat message is received).

People Control Component

The application may display all the individuals of the group (including the current user) in a separate 'pane' that can be collapsed (or hidden) similar to the chat pane. By default the People pane is open. The heading of the People control is the name of the current group (for example, "ABC's group"). All of the group members are listed underneath the group name. The current user can be shown at the top of the list with a different icon next to his/her name and with his/her name in bold. The other members of the group can be shown in ascending alphabetical order below the current user. These names are not in bold and have a different icon from the current user.

Friendly Name

Figure 17:
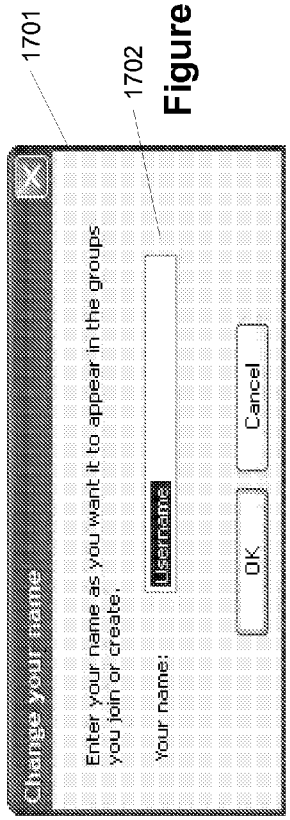
FIGS. 17-18 show user interfaces associated with network configurations in accordance with aspects of the present invention.

FIG. 17 shows a display 1701 where a user can enter his or her name 1702 as he or she wants it displayed to others. This may be referred to as a "friendly name". The friendly name is a global setting that is stored in the registry and shared by all the collaborative applications. Changes to the name in one application should affect the name in other applications that are currently active. Changes to the friendly name should update the current user's friendly name in the people control of all other group members.

Menu Features

Other menu features may include a file menu, a change group option (so that users can change their collaboration group), change name, among others.

"File" Related Launch Points

The File Sharing application can be launched from several locations. In all cases, if a user tries to launch it when an instance of it is already active, then the existing instance must be given focus and brought to the foreground. When a new instance is launched from any of the launch points, at the end of the group join/create process, the application can be pre-initialized with the selected files (showing the appropriate files under the "My shared files" subheading in the "Shared files" list of the application). This may also involve copying any non-local files (for example, on network shares) that are part of the pre-selection to a local temp folder before switching networks.

When an instance of the File sharing application is already active, then the selected files can be added to the current instance. If an instance of the File Sharing application is not present, then the application can be launched (with the user joining the existing group if he is already part of a collaboration group) and then the selected files would to be added automatically.

Exit

On exit a number of actions may occur. A user may be asked to confirm exiting. If the users confirm to exit, the following settings must be restored "Disable user discovery and publishing".

Figure 18:
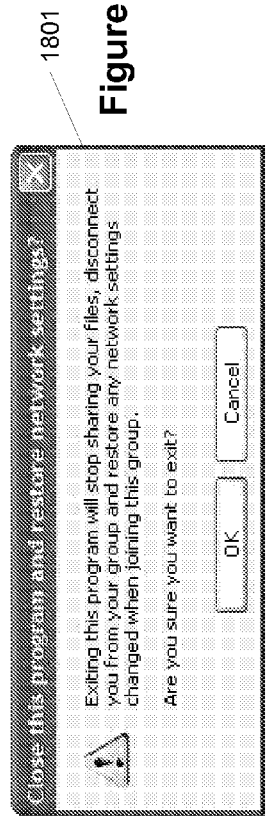

Also, SSDP ports (if any were opened) need to be "closed" to disable people discovery and publishing. The firewall settings may be restored. The DHCP settings (if it was changed for connecting to ad-hoc networks) may be restored. All ad-hoc networks that are created from the collaboration wizard launched through the file sharing application can be removed from the "Preferred network" list in the Networking UI. The files shared by the user originally should no longer be available to the existing group members (unless already downloaded to their own machine). A dialog box 1801 as shown in FIG. 18 may be shown.

Additionally, if network related changes were made through the wizard, the Exit Confirmation dialog" should present the users with the "Restore Network Settings" option (that is checked by default) which provides a way to restore original network settings. The dialog may also need to explain that any manual changes to the network configuration through the Windows Networking UI may be overwritten. If the user wishes to restore the original settings, the following settings that were automatically altered need to be restored. For example, the connection to the original network (if still available) should be restored. The original network settings are those that existed at the time of launching the application initially. Any manual changes made by the user may be overwritten by this restoration process. If multiple changes are made through the wizard, the restoration process may restore the network state to the initial state only. Finally, the system may restore the ad-hoc and infrastructure and network preferences (if it was altered). An alternative implementation could detect if any manual changes had been made to the network configuration while the ad-hoc networking application was running, and avoid prompting the user if none had been made; it would simply go ahead and restore the original network settings.

People Discovery Component

This component is responsible for providing the People discovery support to different collaborative applications so that users can be discovered/published. It is based on Simple Service Discovery Protocol (SSDP) technology. The People discovery Component consists of sub-components—Discovery and Publishing component. The discovery component is used to discover nearby users who have chosen to make themselves discoverable to others. The publishing component is used to publish the presence to others so that they can be discovered.

To assist this process, a SSDP "publish" message should be tagged with a unique identifier for the People discovery component to ensure its messages are not confused with those of other SSDP publishers. In case of infrastructure networks (both Wireless and Wired LANs), the "publish" broadcast messages may also contain additional information regarding the Collaboration Group.

Launch Points

The ad-hoc file sharing system may launch from a number of points. For instance, the system may launch from an initial start menu. Also, the file sharing may launch from a file menu where the file may be set to "people near you" (if one is not a member of a group) and to people in a group (if one is already a member of the group).

Another approach to creating the use of the channel favorite's metaphor to make it easy for users to connect to a preprogrammed network in one click. This may convey the message that wireless networking is similar to using presets on a radio or favorites in an internet browser.

D. Alternatively User Interfaces for Configuring an Ad-Hoc Network

Figure 19:
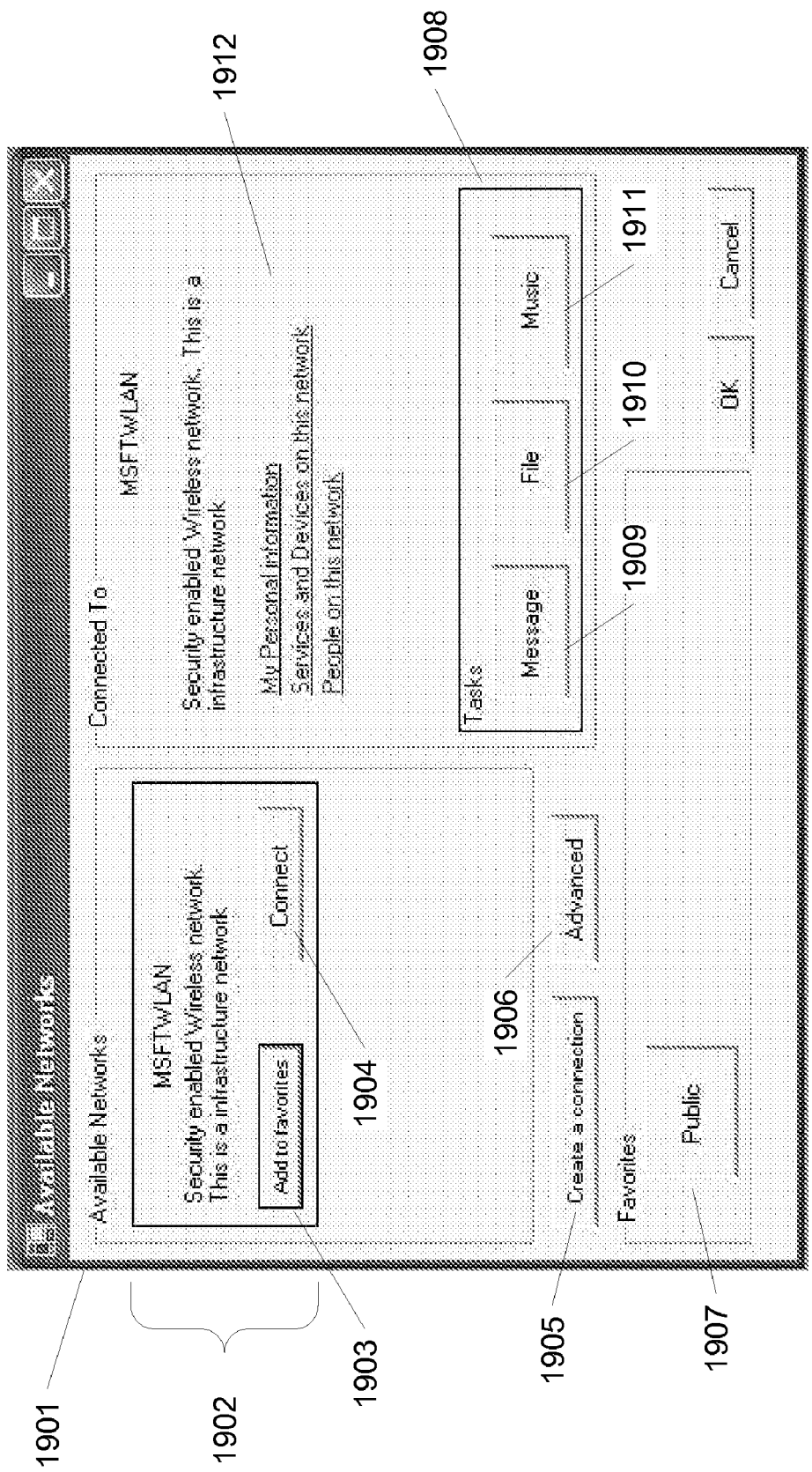

The following relates to alternative user interface for establishing an ad-hoc network in accordance with aspects of the present invention. FIG. 19 shows a wireless networking dialog 1901 in accordance with the alternative interfaces.

On the right hand side of dialog 1901 is the information for the network that the user is currently connected to. Below it are the actions 1912 and 1908 that the user can do on this network including messaging 1909, file transfers 1910, and music transfers 1911, among other options. Available wireless networks are displayed in region 1902 with the option to add to one's favorite networks 1903 and connect to a selected network 1904. Selected favorites may be displayed in region 1907. A connection may be created by clicking on button 1905. Button 1906 leads to advanced features.

Various items may be displayed for a selected network including the name of the available wireless network, its signal strength, a short description of what type of network this is, and if the network is secure or not. There may be an icon or image that is displayed along with the network information. All this information can be displayed as it is available via wireless provisioning services and XML information that is beaconed by nearby machines or routers.

Two buttons on the bottom of each of the available networks. The first button 1903 says connect and the second button 1904 says add to favorites. Clicking on the connect button 1904 may enable the user to connect to the network. This network will no longer appear on the left hand side but will appear on the right under the connected to section of the window. Clicking on the Add to favorites button 1903 may display a dialog box as shown in FIGS. 20 and 21.

Figure 20:
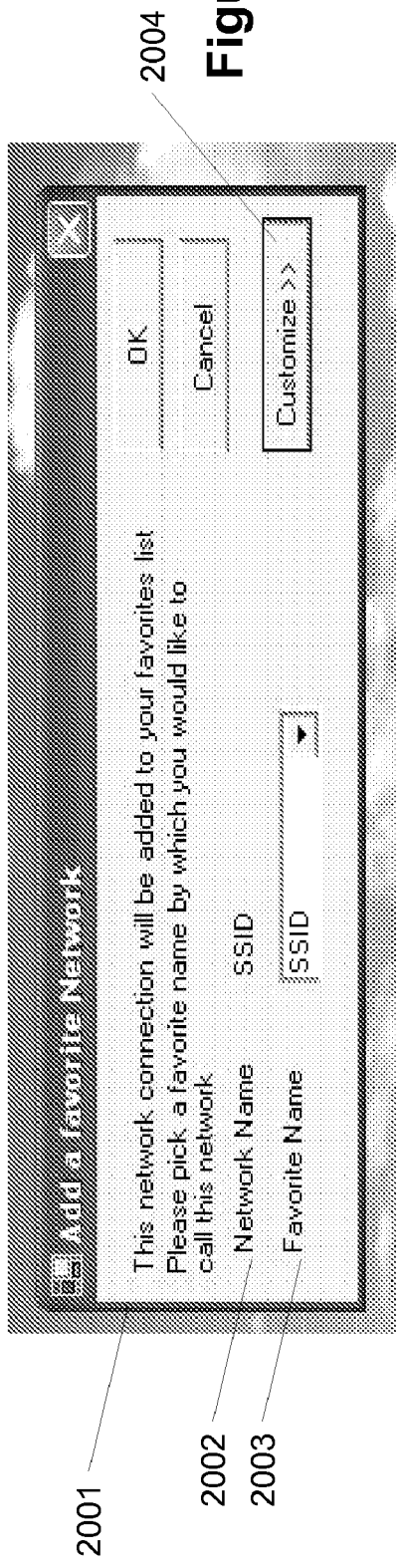
Figure 21:
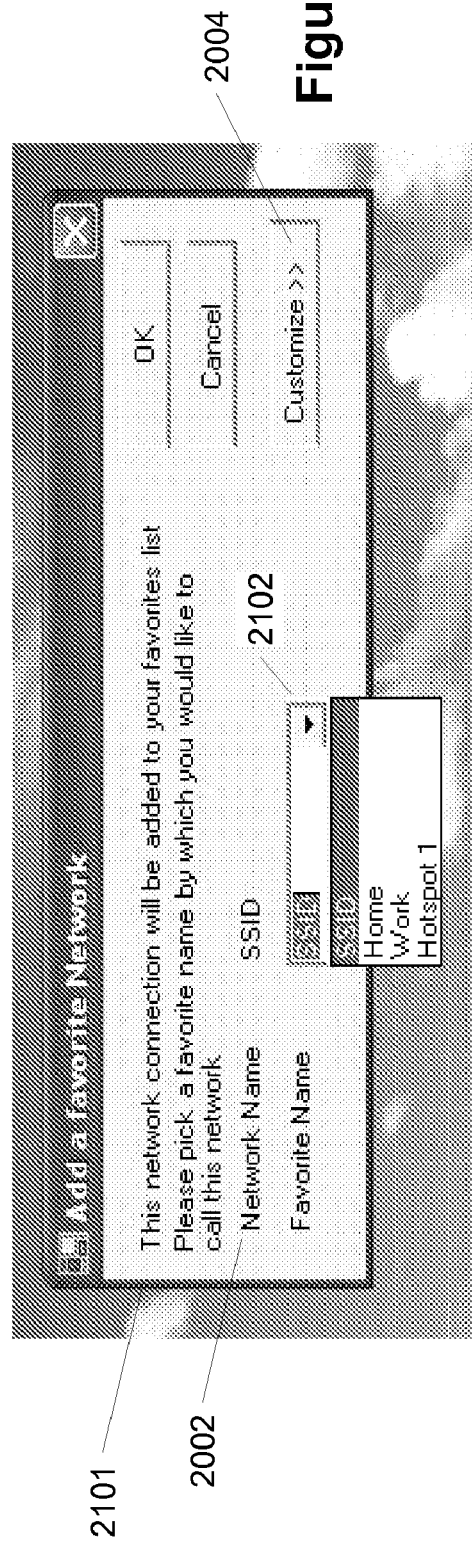

FIGS. 20 and 21 show a dialog 2001 that enables the user to pick a favorite name that is more familiar to the user. Dialog 2001 includes a network name 2002 and a favorite name 2003. Dialog 2001 includes a drop down menu (shown as 2102) associated with the favorite name 2003, which will give the user some options. They can choose to pick a favorite name from this list or type a name of their choice. By clicking on the customize button the user will have the ability to add more information via the My personal information page. Once the user has added a favorite name, they will click on OK. This will make the network disappear from the view available networks list. It is now displayed and highlighted in the favorites section below.

As shown in FIG. 19, under the view available wireless button there are two other buttons 1905 and 1906. The first 1905 is the create a connection button. If the user does not see the network they want to connect to or that they would like to setup an ad hoc network; they can click on the create a connection button 1906. This launches the following dialog as shown in FIG. 22. Here, the user is then asked to pick what kind of network they would like to setup in dialog 2201. The currently available method to setup an infrastructure based network will be used as the UI for this task 2202. But if the user wants to set up an ad hoc based network 2203, then they will get the following dialog 2301 as shown in FIG. 23.

Figure 24:
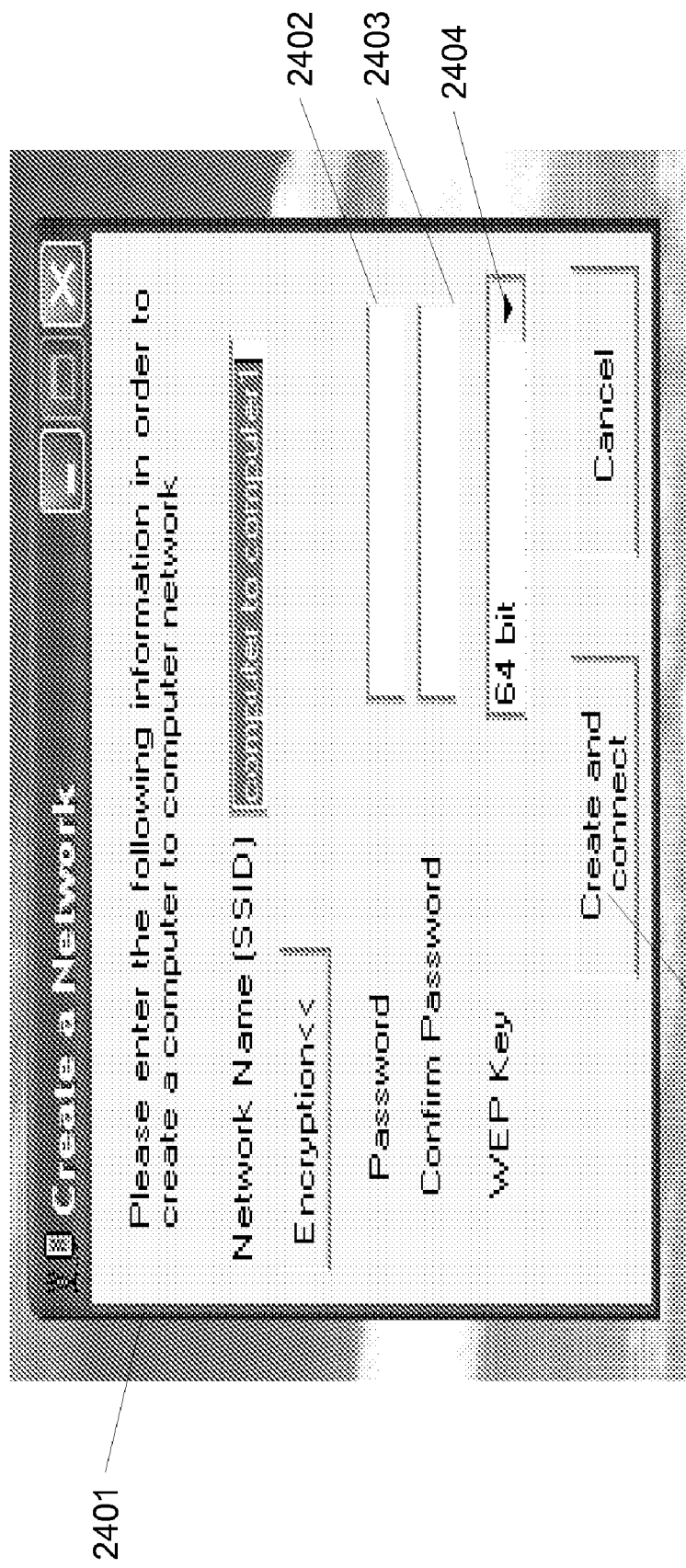

Here, the user is prompted for an SSID in region 2303. Dialog also includes an encryption button 2302, and a create and connect button 2304. A SSID is entered by default and shows up in the Network name field in 2303. This will follow the naming convention "computer to computer network X" where X is a number beginning at 1. The system has a list of wireless networks that are present around it. The system will check to see if there is a network with the same and then check what number is it at. Based on this it will pick what number to display. If there are no networks present then it will display computer to computer network 1. Alternatively the user can enter a name for the SSID in field 2303 and press the Create and connect button 2304. This sets up an ad hoc network and connects the user to it. Only if the user clicks on the encryption button 2302 does the Password option get displayed. Here the user can enter a string password in region 2402 and 2403 of dialog 2401 of FIG. 24. FIG. 24 also includes a WEP key encryption value 2404 and a create and connect button 2405. Alternatively, the password option may come up with every ad-hoc network.

The advanced button 1906 will take the user to the Wireless Network Connection Properties page that allows a user to configure network properties as is known in the art.

In FIG. 19 above, the favorites section 1907 is at the bottom of the window and is scrollable depending on the number of favorites that have been added. Each network is labeled by default with its SSID if the user did not pick a favorite name and a default image if one is provided. This can be changed by right clicking on it and hitting the properties button in the menu. The properties button launches the personal information page related to that network. Another option available in the right click menu is "remove from favorites". A left click on this button establishes a connection to that network. If the network is unavailable the favorite is grayed out and cannot be picked. If a network is part of the favorites, it will not appear as part of the view available wireless connections. In this way there is no confusion with the presence of ad hoc networks. The confusion is if an ad hoc network is present and it is the only node then there is no signal strength. But by making it a part of the favorites it will always be possible to click on it and connect. Further if one of your favorite networks is available you should be able to connect to it in an easy, one click manner.

Figure 25:
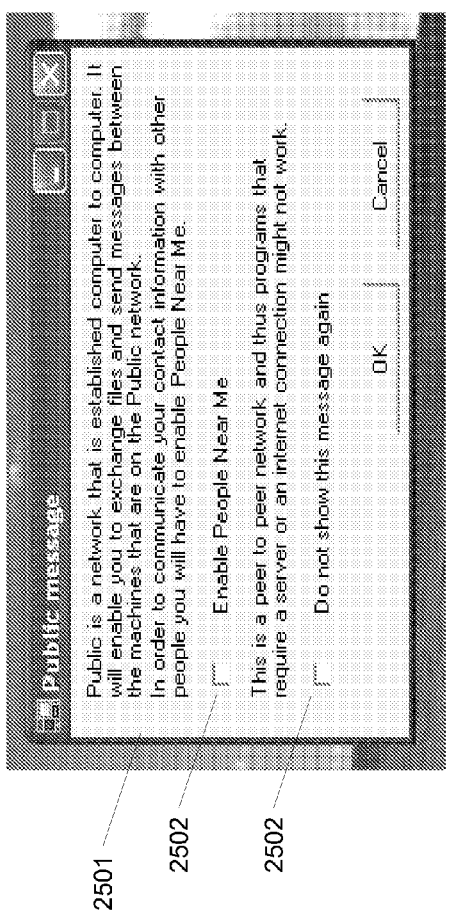

The ad-hoc network by the name of Public is a network that will be available as a favorite as a standard feature that will ship out of the box. This will enable to the user to connect to machines near by in a single click and experience the benefits. When the user clicks on the Public favorite for the first time a message will pop up informing the user of the benefits of this network and its limitations. This will enhance the user experience as the expectations will be set. This message may appear as FIG. 25. In FIG. 25, dialog 2501 includes an "enable people near me" option 2502 and a warning about peer to peer networks 2503.

Figure 26:
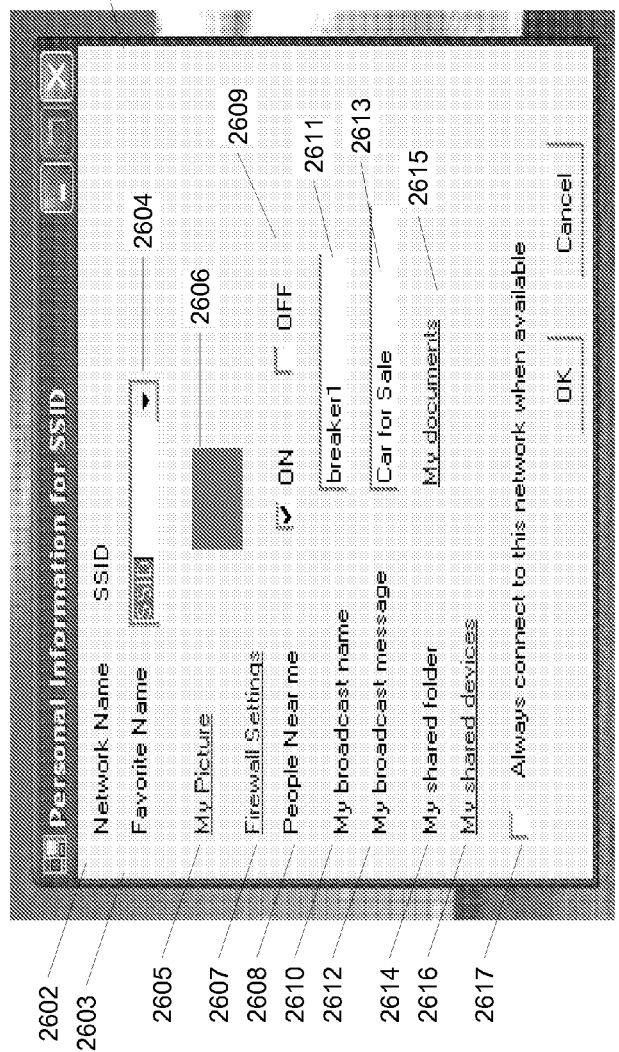

On the right hand side of the main dialog box window in FIG. 19 under the connected to section, the user can see what network they are currently connected to. On the very top of this section is the icon or image pertinent to the network, along with the name and signal strength. Below this is a short description of the network and if it is secure or not. The people on this network enables them to view everyone on this network that has enabled discovery via People Near Me. Clicking on Services and devices available on this network enables the user to view all the devices, folders, internet connections, share point services available to them. Both these functions opens the People Near Me fly out to the respective page so that the user can either view the list of people or devices. Clicking the Personal Information page launches the dialog 2601 as shown in FIG. 26. This enables the user to configure their settings that are related to network they are connected to. This page will be the same page that the People Near Me application uses.

FIG. 26 includes dialog 2601. The dialog 2601 includes a network name 2602, a favorite name 2603 (with menu 2604), the ability to include a picture 2605, firewall settings option 2607, enable people near me setting 2608 and 2609, enabling a broadcast name 2610 with field 2611, a broadcast message 2612 with field 2613, a shared folder 2614, a my documents folder 2615, a list of my shared devices 2616, and an option to always connect to a given network when available 2617.

The network name is the SSID of the network. The user has the option to enter a favorite name of their choice. This name is the same name as the one the user entered when they added it to the favorite list for the first time. There is a drop down menu 2604 (also shown as 2702 with dialog 2701 in FIG. 27) with some preset options. There is a link to the firewall settings 2607. This enables the user to modify and make changes to the firewall settings and allows them to view the status of their firewall. The user can also modify the picture 2606 that is currently being displayed as the link to their favorite.

Figure 27:
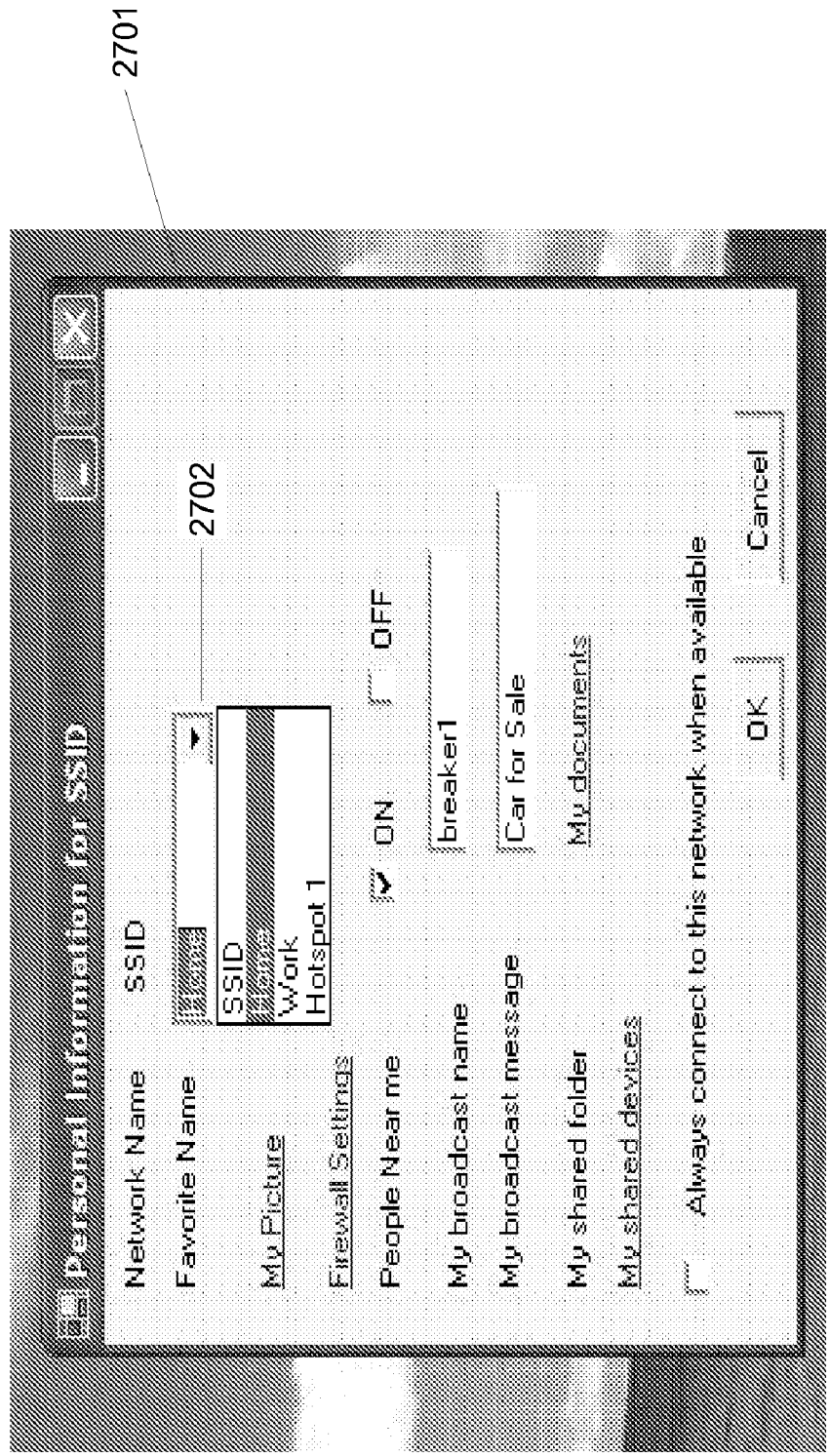

The user is also given the ability to broadcast a message along with his name 2611. This is useful in providing context and some background as to who this person is. By clicking on My shared folder the user is presented with a browser-type window in which they can pick the folder that they want to share out. The user can share out devices in an easy way by clicking on the My shared devices link. It will then bring up a menu which enables the user to pick the devices they want to share out. This list is pre populated based on the devices that can be shared out as shown in FIG. 27.

By clicking on the Always connect to this network when available the user does not have to always pick when there are multiple networks available. For example if the user is in an apartment building and there are 5 different wireless routers that his machine can access, by picking his home network he will always connect to that regardless of the strength of the other networks around. If there is ever a conflict such that there are 2 networks available that the user has checked of as the networks to always connect to, the user is connected to the network with the strongest signal. If the user decides to change the network, the choice is saved and in the future if there is a conflict the operating system remembers the decision and picks the right network.

Figure 28:
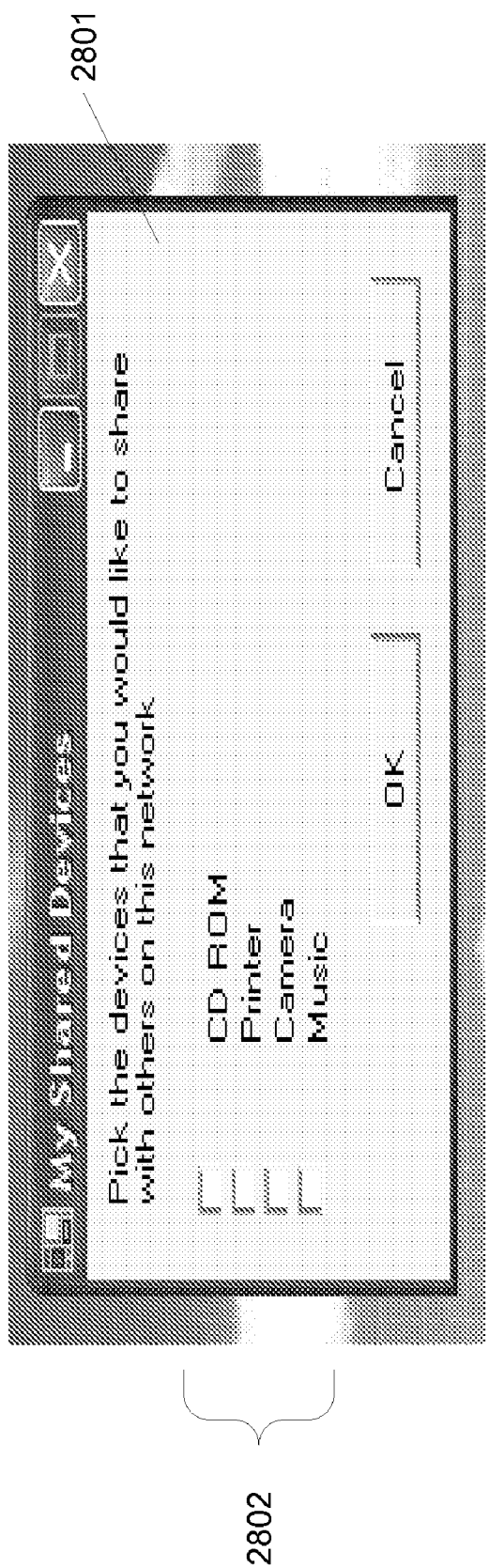

FIG. 28 shows a dialog 2801 that lists the devices that are to be shared (here, a CD ROM, a printer, a camera, and music). The selection of the items may be enabled as action buttons in other parts of the user interface to allow access to the information stored in these devices.

As described above, the action buttons enable the user to Send a file, send a message, print a document, listen to music and do other actions. These actions are based on the network they are connected to, the devices and services available and the people that they can see. Once an action is clicked like send a message the user is presented with the People Near Me window which is relevant to the action. This could be a list of names of the people near them. They then pick a person and then are given a text box to type their message. In the case of listen to Music a list with the names of only those people that are streaming music would be displayed. The user would click on the name of an individual and a media player would be launched and the content would start playing.

A message may be displayed once a user indicates that they want to share information with another. The message may indicate that "If the person you would like to communicate with is unavailable, please ask them to switch to the Public channel and ask them to enable "People Near Me". This is a computer to computer network and will setup a connection with their machine." "Some programs that require a connection to the internet or to a server might not work on this network." Based on this message, a user may then prompt the other person to enable their computer to be realized by the current system and ad-hoc network.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A computing device comprising:
   a user interface allowing a user to instruct the computing device to create or join an ad-hoc network, said user interface displayable on a computer screen, said user interface comprising at least one dialog box that allows the user to launch access to said ad-hoc network where information is pre-populated in said dialog box for said user, and at least one computer-readable medium storing computer-executable instructions which, when executed, cause the computing device, upon leaving said ad-hoc network, to reconfigure network connectivity settings on the computing device to a state prior to the access to the ad-hoc network.

2. The computing device of claim 1, where said access to said ad-hoc network is launched from a menu bar.

3. The computing device of claim 1, where said access to said ad-hoc network is launched upon selecting at least one of a file transfer option relating to one or more files, audio/video streaming option, a gaming option, and an option that connects users in a point to point network.

4. The computing device of claim 1, wherein said user interface alerts said user that network connections will be lost when reconfiguring a network adaptor.

5. The computing device of claim 1, where said user interface permits manual leaving from an ad-hoc network.

6. The computing device of claim 1, said user interface including a dialog that indicates other users in said network.

7. The computing device of claim 6, wherein a system determines the other users in said network and displays them in said dialog.

8. The computing device of claim 1, further comprising a file transfer dialog.

9. The computing device of claim 8, said file transfer dialog including an indication of the status of files in said file transfer dialog.

10. The computing device of claim 1, further comprising a chat dialog.

11. The computing device of claim 1, further comprising a people control dialog.

12. The computing device of claim 1, wherein the user interface further comprises at least one second dialog box that allows the user to instruct the computing device whether to execute the computer-executable instructions to reconfigure the network connectivity settings.

13. A process for initiating an ad-hoc network from an operating system of a computing device, said process comprising:
   receiving a user indication to use an ad-hoc network;
   determining if said user wants to join or create an ad-hoc network;
   performing at least one of joining the existing ad-hoc network and creating the ad-hoc network;
   using said ad-hoc network; and
   reconfiguring network settings on the computing device to a state prior to the act of performing upon leaving said ad-hoc network.

14. The process according to claim 13, wherein using said ad-hoc network further comprises at least one of: sharing files; audio/video streaming; and gaming.

15. The process according to claim 13, wherein using said ad-hoc network further comprises: chatting.

16. The process according to claim 13, wherein using said ad-hoc network further comprises: controlling people having access to said ad-hoc network.

17. The process according to claim 13, said method further comprising the step of modifying a network connection to create said ad-hoc network.

18. The process according to claim 13, said method further comprising the step of modifying a network connection to join said ad-hoc network.

19. The process according to claim 13, said method further comprising the step of modifying a network connection when leaving said ad-hoc network.

20. A computer storage medium comprising computer executable instructions, when executed by the computer, perform the process, comprising: receiving a user indication to use an ad-hoc network; determining if said user wants to join or create an ad-hoc network; performing at least one of joining the existing ad-hoc network and creating the ad-hoc network; using said ad-hoc network, and reconfiguring network settings on the computing device to a state prior to the act of performing upon leaving said ad-hoc network.

* * * * *